(12) United States Patent
Sobu

(10) Patent No.: US 11,327,234 B2
(45) Date of Patent: May 10, 2022

(54) OPTICAL SEMICONDUCTOR DEVICE AND RECEPTION APPARATUS

(71) Applicant: FUJITSU LIMITED, Kawasaki (JP)

(72) Inventor: Yohei Sobu, Chiyoda (JP)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 17/036,105

(22) Filed: Sep. 29, 2020

(65) Prior Publication Data

US 2021/0103100 A1 Apr. 8, 2021

(30) Foreign Application Priority Data

Oct. 4, 2019 (JP) .............................. JP2019-183665

(51) Int. Cl.
*G02B 6/28* (2006.01)
*G02B 6/122* (2006.01)
*G02B 6/12* (2006.01)

(52) U.S. Cl.
CPC ......... *G02B 6/2804* (2013.01); *G02B 6/2813* (2013.01); *G02B 6/1228* (2013.01); *G02B 2006/12097* (2013.01); *G02B 2006/12119* (2013.01)

(58) Field of Classification Search
CPC ................ G02B 6/2804; G02B 6/1228; G02B 2006/12097; G02B 2006/12119; G02B 6/2813
See application file for complete search history.

(56) References Cited

U.S. PATENT DOCUMENTS

| 10,126,498 | B1 | 11/2018 | Ma et al. |
| 2011/0229069 | A1* | 9/2011 | Bontempi .............. G02B 6/122 385/3 |
| 2012/0183254 | A1 | 7/2012 | Inoue |
| 2012/0230631 | A1 | 9/2012 | Jeong |
| 2017/0227712 | A1* | 8/2017 | Kato .................... G02B 6/1228 |
| 2019/0049665 | A1* | 2/2019 | Ma ........................ G02B 6/125 |
| 2020/0041726 | A1* | 2/2020 | Yamazaki ............ H04B 10/615 |

FOREIGN PATENT DOCUMENTS

| JP | 2011-257513 A | 12/2011 |
| JP | 2012-027211 A | 2/2012 |
| JP | 2012-191302 A | 10/2012 |
| WO | 2009/098829 A1 | 8/2009 |
| WO | 2016/051698 A1 | 4/2016 |

* cited by examiner

*Primary Examiner* — Leslie C Pascal
(74) *Attorney, Agent, or Firm* — Fujitsu Patent Center

(57) ABSTRACT

An optical semiconductor device includes a first optical coupler including a first input port and a second input port, a first optical branching device including a first output port and a second output port, a second optical coupler including a third input port and a fourth input port, a second optical branching device including a third output port and an fourth output port, a first single mode waveguide configured to connect the second input port and the first output port, a second single mode waveguide configured to connect the second output port and the third input port, a third single mode waveguide configured to connect the fourth input port and the third output port, and a fourth single mode waveguide configured to connect the fourth output port and the first input port.

9 Claims, 31 Drawing Sheets

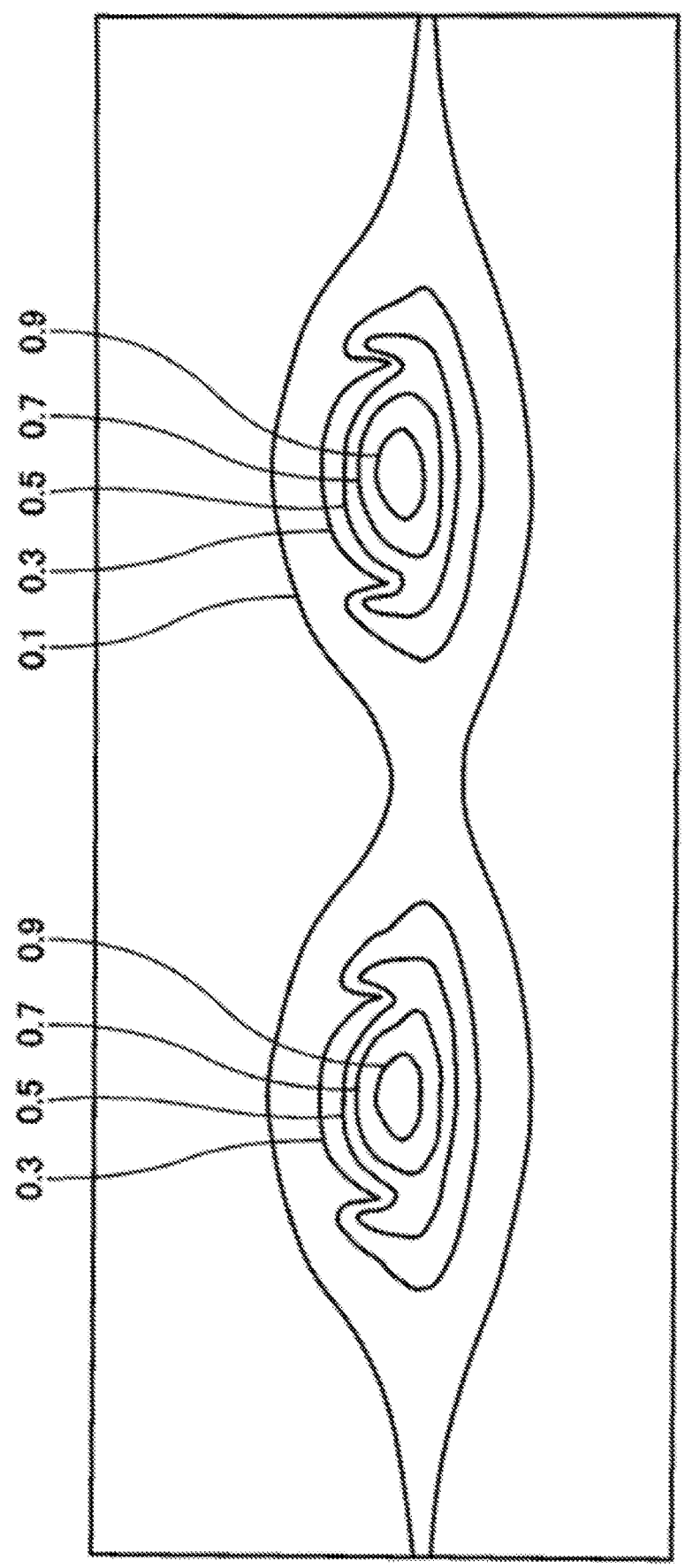

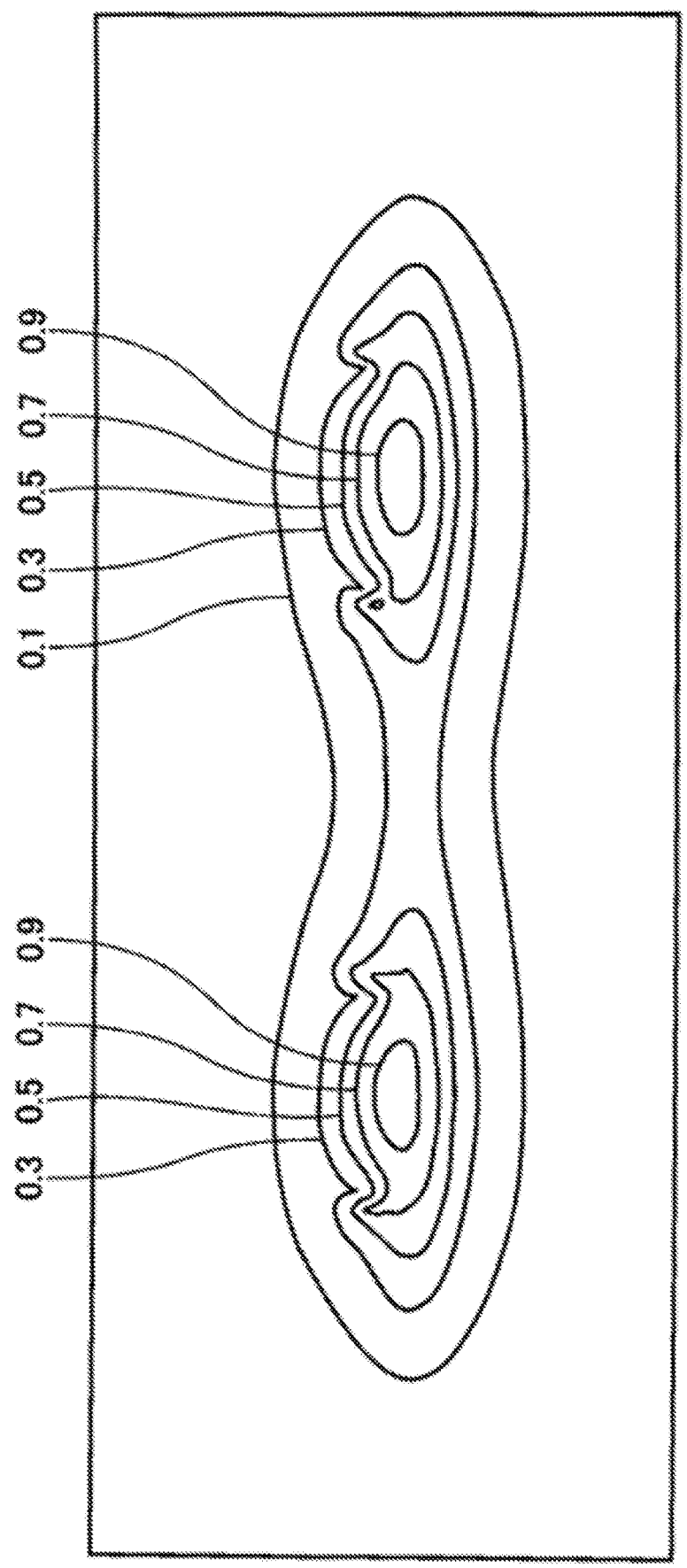

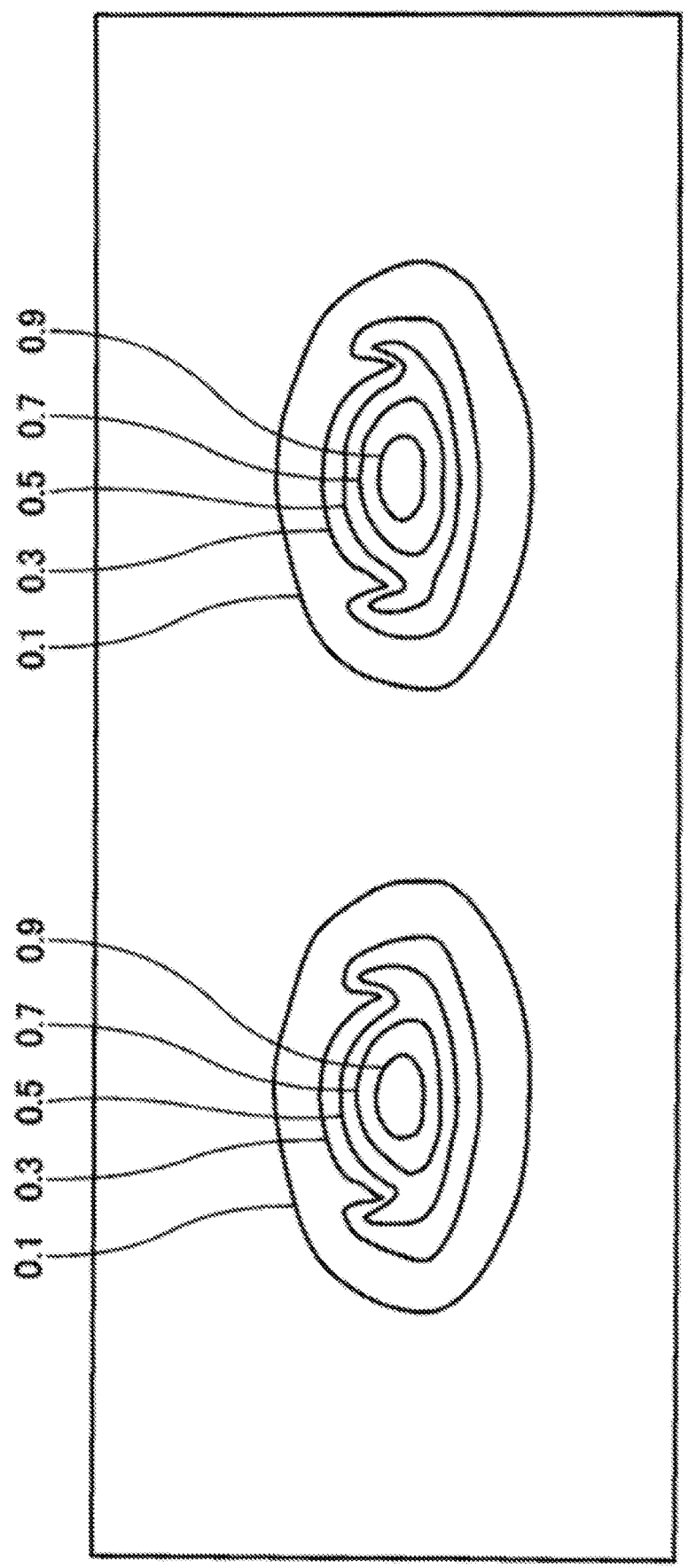

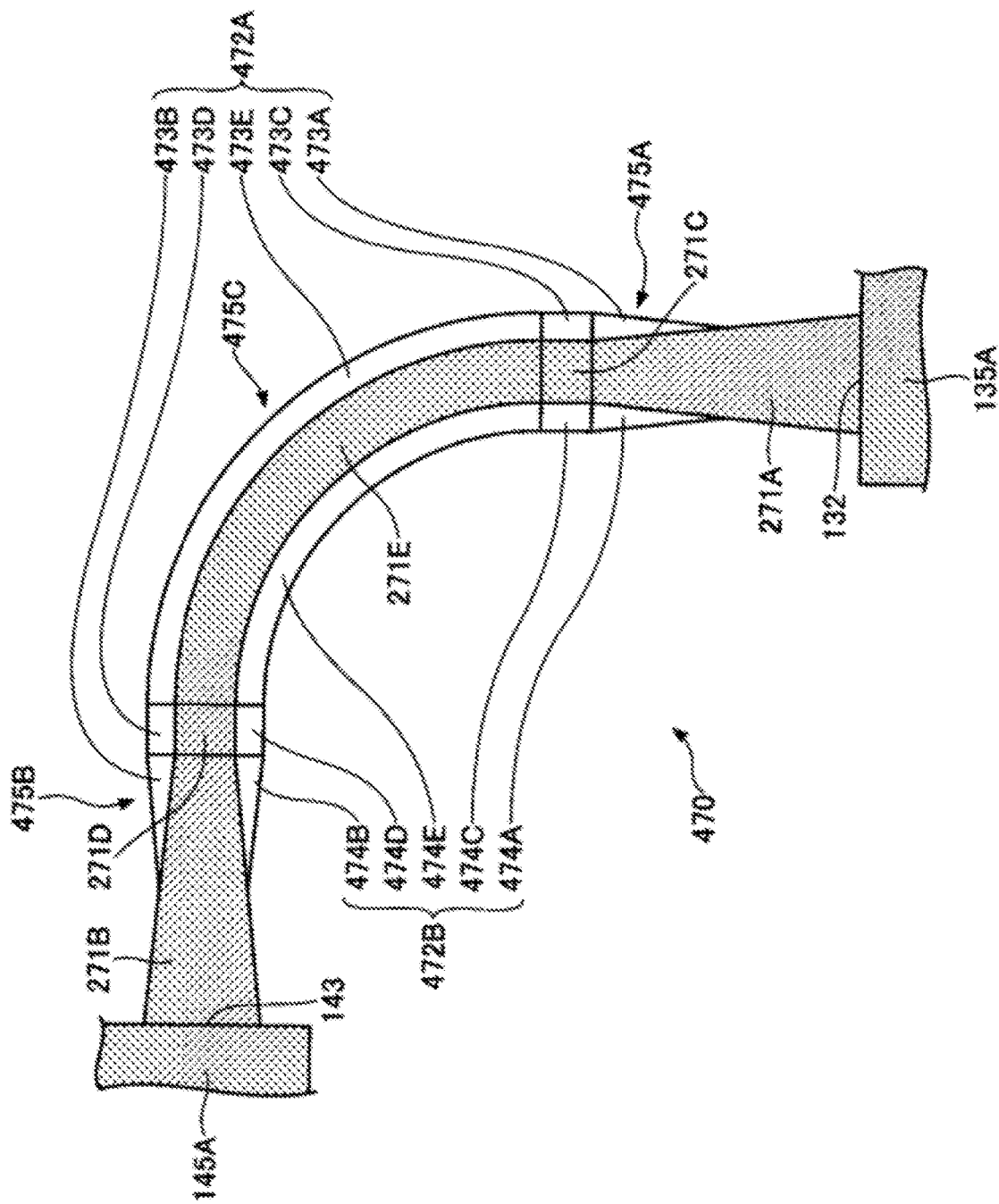

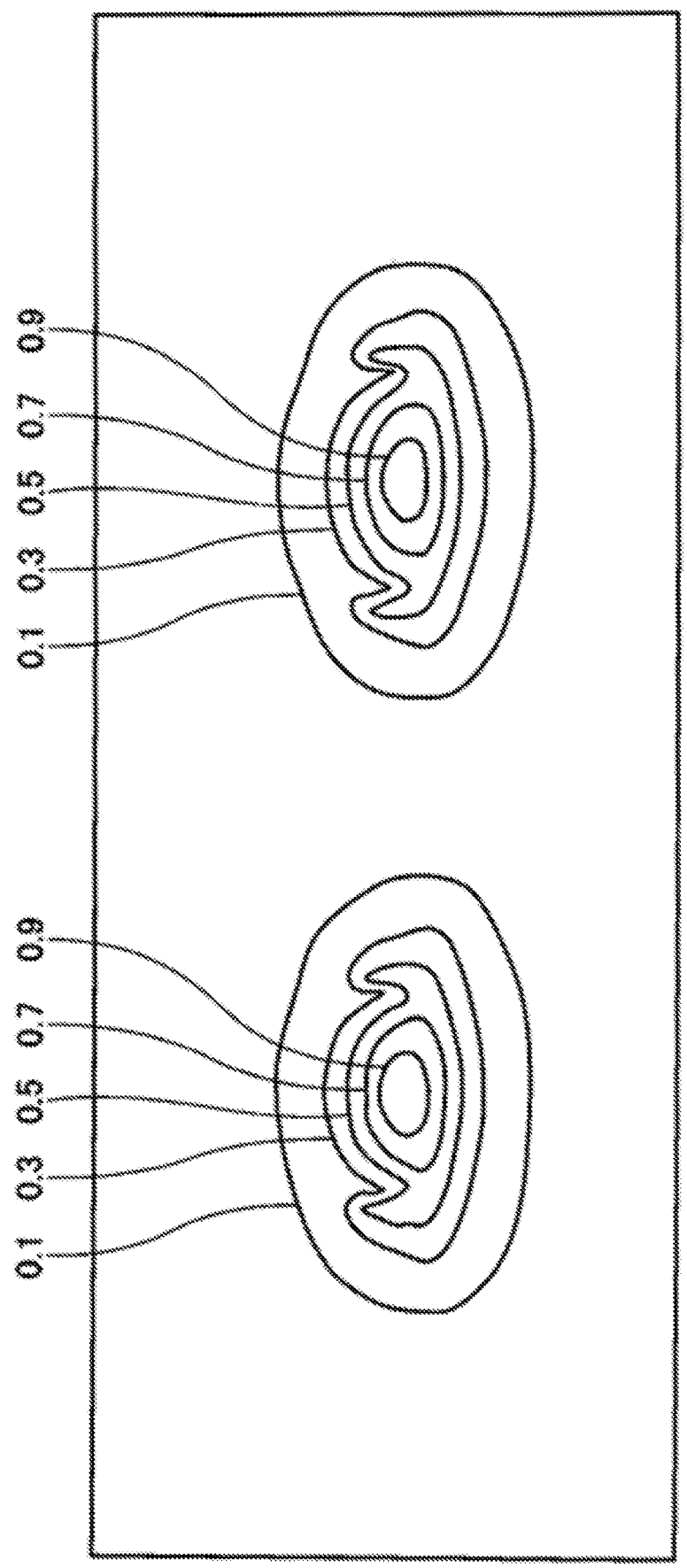

OPTICAL SEMICONDUCTOR DEVICE AND RECEPTION APPARATUS

CROSS-REFERENCE TO RELATED APPLICATION

This application is based upon and claims the benefit of priority of the prior Japanese Patent Application No. 2019-183665, filed on Oct. 4, 2019, the entire contents of which are incorporated herein by reference.

FIELD

The embodiments discussed herein are related to an optical semiconductor device and a reception apparatus.

BACKGROUND

A 90-degree hybrid circuit is a circuit that separates, by causing phase-modulated signal light and local oscillator (LO) light to interfere with each other, the signal light into I-axis components and Q-axis components on a complex plane and performs demodulation. Examples of a phase modulation method include quadrature phase shift keying (QPSK) and quadrature amplitude modulation (QAM).

In the prior art, a 90-degree hybrid circuit using four optical couplers and channel-type bending waveguides has been proposed.

International Publication Pamphlet No. WO 2016/051698 and 2009/098829, Japanese Laid-open Patent Publication No. 2011-257513, 2012-27211, and 2012-191302, and U.S. Pat. No. 10,126,498 are disclosed as related art.

SUMMARY

According to an aspect of the embodiments, an optical semiconductor device includes a first optical coupler including a first input port, a second input port, a first output port, and a second output port; a first optical branching device including a third input port, a fourth input port, a third output port, and a fourth output port; a second optical coupler including a fifth input port, a sixth input port, a fifth output port, and a sixth output port; a second optical branching device including a seventh input port, a seventh output port, and an eighth output port; a first single mode waveguide configured to connect the second input port and the third output port; a second single mode waveguide configured to connect the fourth output port and the fifth input port; a third single mode waveguide configured to connect the sixth input port and the seventh output port; and a fourth single mode waveguide configured to connect the eighth output port and the first input port.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12B is a diagram illustrating a mode distribution when the rib-type single mode waveguide having the thickness of the slab portions of 110 nm is connected, in relation to the second embodiment;

FIG. 13B is a diagram illustrating a mode distribution when the rib-type single mode waveguide having the thickness of the slab portions of 150 nm is connected, in relation to the second embodiment;

FIG. 16B is a diagram illustrating a mode distribution when the rib-type single mode waveguide having the thickness of the slab portions of 150 nm is connected, in relation to the third embodiment;

FIG. 18C is a plan view illustrating a part of FIG. 17 in an enlarged manner;

FIG. 19B is a diagram illustrating a mode distribution when the rib-type single mode waveguide having the thickness of the slab portions of 150 nm is connected, in relation to the fourth embodiment;

DESCRIPTION OF EMBODIMENTS

Figure 1:
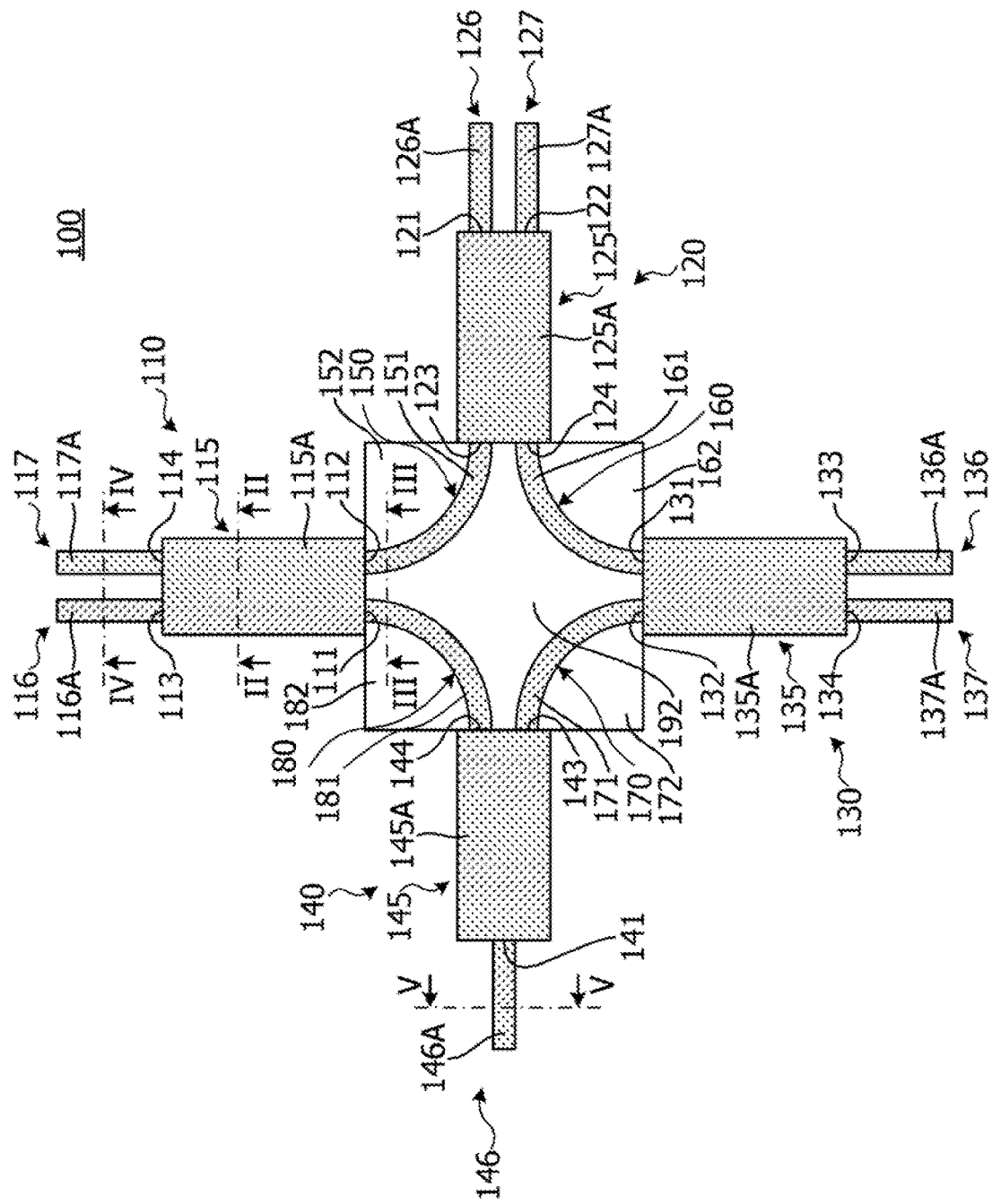
FIG. 1 is a perspective plan view illustrating an optical semiconductor device according to a first embodiment.

In the related art, the characteristics of the conventional 90-degree hybrid circuit using four optical couplers and a channel-type bending waveguide is extremely susceptible to a phase error due to a change in the sectional structure of the bending waveguide. Therefore, the characteristics of the conventional 90-degree hybrid circuit are extremely susceptible to manufacturing variations.

One aspect of the innovation is to provide an optical semiconductor device and a receiver that can be less susceptible to manufacturing variations.

Hereinafter, embodiments of the present disclosure will be specifically described with reference to the accompanying drawings. Note that, in the present specification and drawings, components having substantially the same functional configuration are denoted by the same reference numerals, and redundant description may be omitted.

First Embodiment

Figure 2:
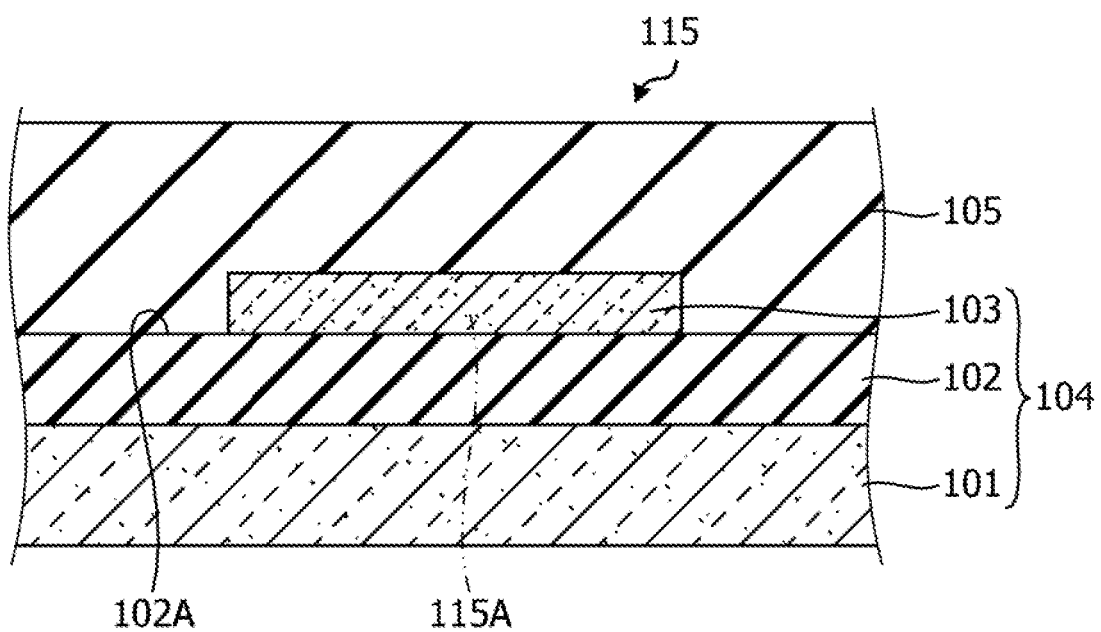
FIG. 2 is a cross-sectional view illustrating the optical semiconductor device according to the first embodiment.
Figure 3:
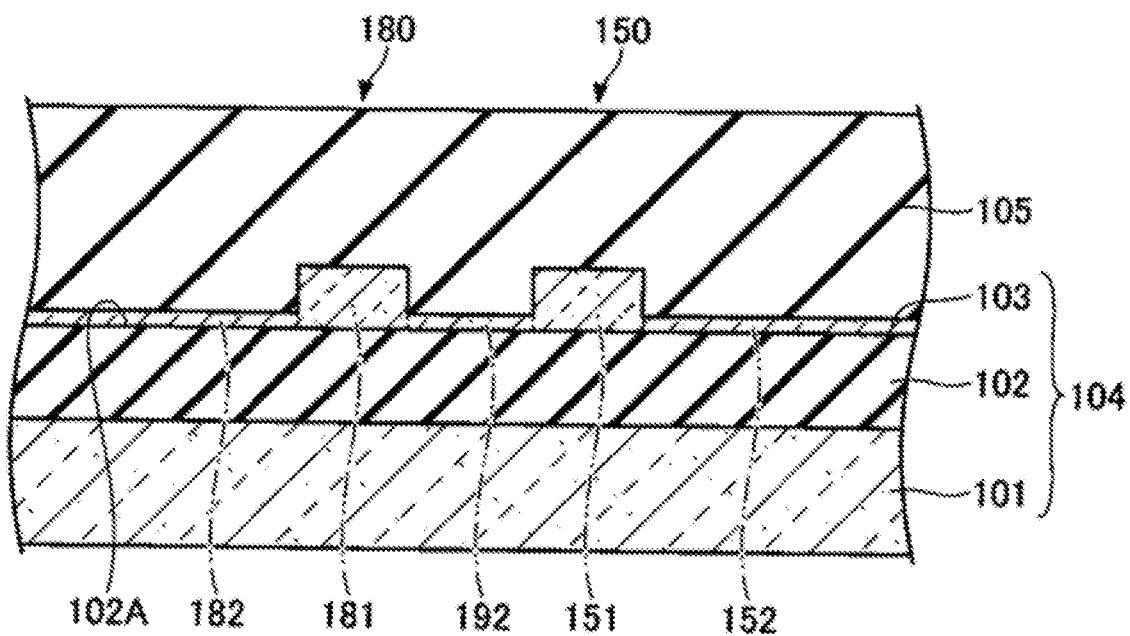
FIG. 3 is a cross-sectional view illustrating the optical semiconductor device according to the first embodiment.
Figure 4:
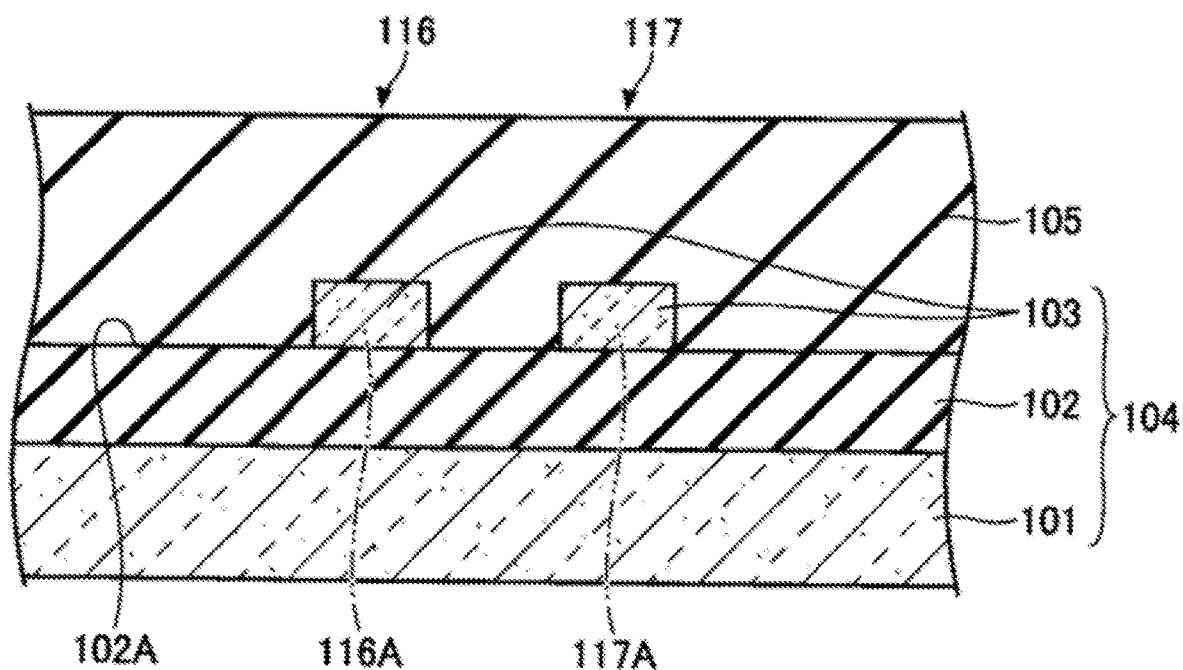
FIG. 4 is a cross-sectional view illustrating the optical semiconductor device according to the first embodiment.
Figure 5:
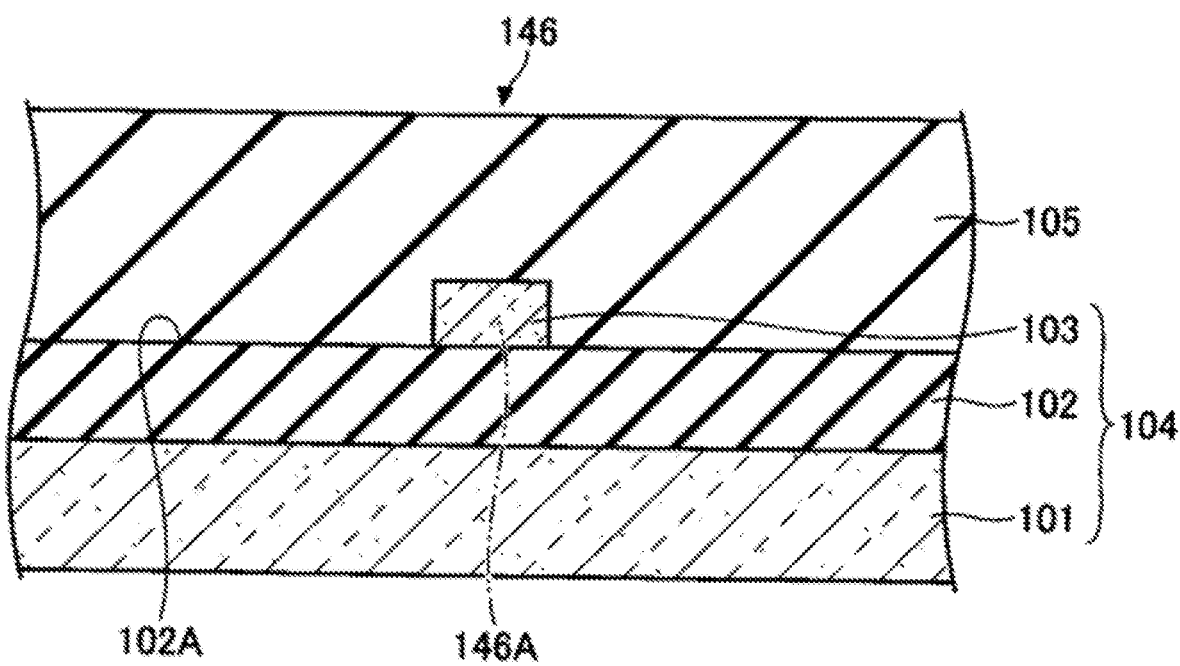
FIG. 5 is a cross-sectional view illustrating the optical semiconductor device according to the first embodiment.

First, a first embodiment will be described. The first embodiment relates to an optical semiconductor device including a 90-degree hybrid circuit FIG. 1 is a perspective plan view illustrating the optical semiconductor device according to the first embodiment. FIGS. 2 to 5 are ross-sectional views each illustrating the optical semiconductor device according to the first embodiment. FIG. 2 is a cross-sectional view taken along a line II-II defined in FIG. 1. FIG. 3 is a cross-sectional view taken along a line III-III defined in FIG. 1. FIG. 4 is a cross-sectional view taken along a line IV-IV defined in FIG. 1. FIG. 5 is a cross-sectional view taken along a line V-V defined in FIG. 1. The optical semiconductor device according to the first embodiment is configured using, for example, a silicon on insulator (SOI) substrate and a cladding layer on the SOI substrate. The SOI substrate includes a silicon substrate, an insulating layer on the silicon substrate, and a silicon layer on the insulating layer.

As illustrated in FIG. 1, an optical semiconductor device 100 according to the first embodiment includes a 2×2 multi-mode interference (MMI) coupler 110, a 2×2 MMI coupler 120, a 2×2 MMI coupler 130, and a 1×2 MMI coupler 140. The 2×2 MMI coupler 110 is an example of a first optical coupler, the 2×2 MMI coupler 120 is an example of a first optical branching device, the 2×2 MMI coupler 130 is an example of a second optical coupler, and the 1×2 MMI coupler 140 is an example of a second optical branching device.

The 2×2 MMI coupler 110 includes an input port 111, an input port 112, an output port 113, and an output port 114. The input port 111 is an example of a first input port, the input port 112 is an example of a second input port, the output port 113 is an example of a first output port, and the output port 114 is an example of a second output port.

The 2×2 MMI coupler 120 includes an input port 121, an input port 122, an output port 123, and an output port 124. The input port 121 is an example of a third input port, the input port 122 is an example of a fourth input port, the output port 123 is an example of a third output port, and the output port 124 is an example of a fourth output port.

The 2×2 MMI coupler 130 includes an input port 131, an input port 132, an output port 133, and an output port 134. The input port 131 is an example of a fifth input port, the input port 132 is an example of a sixth input port, the output port 133 is an example of a fifth output port, and the output port 134 is an example of a sixth output port.

The 1×2 MMI coupler 140 includes an input port 141, an output port 143, and an output port 144. The input port 141 is an example of a seventh input port, the output port 143 is an example of a seventh output port, and the output port 144 is an example of an eighth output port.

The 2×2 MMI coupler 110 includes a channel-type multimode waveguide 115. As illustrated in FIG. 2, the multimode waveguide 115 is configured using, for example, an SOI substrate 104 and a dadding layer 105 on the SOI substrate 104. The SOI substrate 104 includes a silicon substrate 101, an insulating layer 102 on the silicon substrate 101, and a silicon layer 103 on the insulating layer 102. For example, the insulating layer 102 and the cladding layer 105 are silicon oxide layers. By processing the silicon layer 103, a core portion 115A of the multimode waveguide 115 is formed. The multimode waveguide 115 is an example of a first multimode waveguide.

The 2×2 MMI coupler 120 includes a channel-type multimode waveguide 125. The multimode waveguide 125 is also configured using, for example, an SOI substrate 104 and a dadding layer 105. By processing a silicon layer 103, a core portion 125A of the multimode waveguide 125 is formed. The multimode waveguide 125 is an example of a second multimode waveguide.

The 2×2 MMI coupler 130 includes a channel-type multimode waveguide 135. The multimode waveguide 135 is also configured using, for example, an SOI substrate 104 and a cladding layer 105. By processing a silicon layer 103, a core portion 135A of the multimode waveguide 135 is formed. The multimode waveguide 135 is an example of a third multimode waveguide.

The 1×2 MMI coupler 140 includes a channel-type multimode waveguide 145. The multimode waveguide 145 is also configured using, for example, an SOI substrate 104 and a dadding layer 105. By processing a silicon layer 103, a core portion 145A of the multimode waveguide 145 is formed. The multimode waveguide 145 is an example of a fourth multimode waveguide.

The optical semiconductor device 100 further includes a rib-type single mode waveguide 150 that optically connects the input port 112 and the output port 123, a rib-type single mode waveguide 160 that optically connects the output port 124 and the input port 131, a rib-type single mode waveguide 170 that optically connects the input port 132 and the output port 143, and a rib-type single mode waveguide 180 that optically connects the output port 144 and the input port 111. The single mode waveguide 150 is an example of a first single mode waveguide, the single mode waveguide 160 is an example of a second single mode waveguide, the single mode waveguide 170 is an example of a third single mode waveguide, and the single mode waveguide 180 is an example of a fourth single mode waveguide. The single mode waveguides 150, 160, 170 and 180 may be bending waveguides. Each of the single mode waveguides 150, 160, 170 and 180 may be formed over an upper surface 102A of the insulating layer 102. The upper surface 102A is an example of a common plane.

The single mode waveguide 150 includes, for example, a core portion 151 and slab portions 152 and 192 extending from the core portion 151 in directions parallel to the upper surface 102A. The single mode waveguide 160 includes, for example, a core portion 161 and slab portions 162 and 192 extending from the core portion 161 in directions parallel to the upper surface 102A. The single mode waveguide 170 includes, for example, a core portion 171 and slab portions 172 and 192 extending from the core portion 171 in directions parallel to the upper surface 102A. The single mode waveguide 180 includes, for example, a core portion 181 and slab portions 182 and 192 extending from the core portion 181 in directions parallel to the upper surface 102A. The slab portion 192 may be shared by the single mode waveguides 150, 160, 170 and 180. The core portion 151 is an example of a first core portion, and the slab portions 152 and 192 are an example of a first slab portion. The core portion 161 is an example of a second core portion, and the slab portions 162 and 192 are an example of a second slab portion. The core portion 171 is an example of a third core portion, and the slab portions 172 and 192 are an example of a third slab portion. The core portion 181 is an example of a fourth core portion, and the slab portions 182 and 192 are an example of a fourth slab portion.

As illustrated in FIG. 3, the single mode waveguides 150 and 180 are configured using, for example, an SOI substrate 104 and a dadding layer 105. By processing a silicon layer 103, the core portions 151 and 181 and the slab portions 152, 182 and 192 are formed. Similarly, by processing the silicon layer 103, the core portions 161 and 171 and the slab portions 162 and 172 are formed.

In a plan view from the direction perpendicular to the upper surface of the SOI substrate 104, the 2×2 MMI coupler 110, the 2×2 MMI coupler 120, the 2×2 MMI coupler 130 and the 1×2 MMI coupler 140 are arranged clockwise in this order. Hereinafter, the plan view from the direction perpendicular to the upper surface of the SOI substrate 104 is simply referred to as "plan view". The input port 111 and the input port 132 may face each other, and the input port 112 and the input port 131 may face each other. The output port 123 and the output port 144 may face each other, and the output port 124 and the output port 143 may face each other. In the plan view, the single mode waveguides 150, 160, 170 and 180 do not intersect each other. In the plan view, the slab portion 192 is inside the core portions 151, 161, 171 and 181. In the plan view, the slab portions 152, 162, 172 and 182 are outside the core portions 151, 161, 171 and 181. That is, for example, the slab portions 152, 162, 172 and 182 and the slab portion 192 are on opposite sides of the core portions 151, 161, 171 and 181.

The optical semiconductor device 100 further includes a single mode waveguide 116 optically connected to the output port 113, a single mode waveguide 117 optically connected to the output port 114, a single mode waveguide 126 optically connected to the input port 121, a single mode waveguide 127 optically connected to the input port 122, a single mode waveguide 136 optically connected to the output port 133, a single mode waveguide 137 optically connected to the output port 134, and a single mode waveguide 146 optically connected to the input port 141. The single mode waveguides 116, 117, 126, 127, 136, 137 and 146 are, for example, channel-type single mode waveguides.

As illustrated in FIG. 4, the single mode waveguides 116 and 117 are configured using, for example, an SOI substrate 104 and a dadding layer 105. By processing a silicon layer 103, a core portion 116A of the single mode waveguide 116 and a core portion 117A of the single mode waveguide 117 are formed. Similarly, by processing silicon layers 103, a core portion 126A of the single mode waveguide 126, a core portion 127A of the single mode waveguide 127, a core portion 136A of the single mode waveguide 136, and a core portion 137A of the single mode waveguide 137 are formed.

As illustrated in FIG. 5, the single mode waveguide 146 is configured using, for example, an SOI substrate 104 and a dadding layer 105. By processing a silicon layer 103, a core portion 146A of the single mode waveguide 146 is formed.

In the optical semiconductor device 100, for example, a phase modulation signal (signal light) such as a QPSK signal is input from the single mode waveguide 126 or 127 to the input port 122 of the 2×2 MMI coupler 120. Furthermore, local oscillator (LO) light is input from the single mode waveguide 146 to the input port 141 of the 1×2 MMI coupler 140. For example, wavelengths of the signal light and the LO light are each 1.55 μm. The signal light is branched into two by the 2×2 MMI coupler 120 and output from the output ports 123 and 124. The signal light output from the output port 123 is input to the input port 112 of the 2×2 MMI coupler 110 via the single mode waveguide 150, and the signal light output from the output port 124 is input to the input port 131 of the 2×2 MMI coupler 130 via the single mode waveguide 160. The LO light is branched into two by the 1×2 MMI coupler 140 and output from the output ports 143 and 144. The LO light output from the output port 143 is input to the input port 132 of the 2×2 MMI coupler 130 via the single mode waveguide 170, and the LO light output from the output port 144 is input to the input port 111 of the 2×2 MMI coupler 110 via the single mode waveguide 180. The 2×2 MMI coupler 110 combines the LO light input to the input port 111 and the signal light input to the input port 112, and outputs Q component signal light having a phase difference of 180 degrees from the output ports 113 and 114 to the single mode waveguides 116 and 117. The 2×2 MMI coupler 130 combines the LO light input to the input port 132 and the signal light input to the input port 131, and outputs I component signal light having a phase difference of 180 degrees from the output ports 133 and 134 to the single mode waveguides 136 and 137. In this way, four beams of signal light having phases shifted by 90 degrees are output from the optical semiconductor device 100.

Figure 6A:
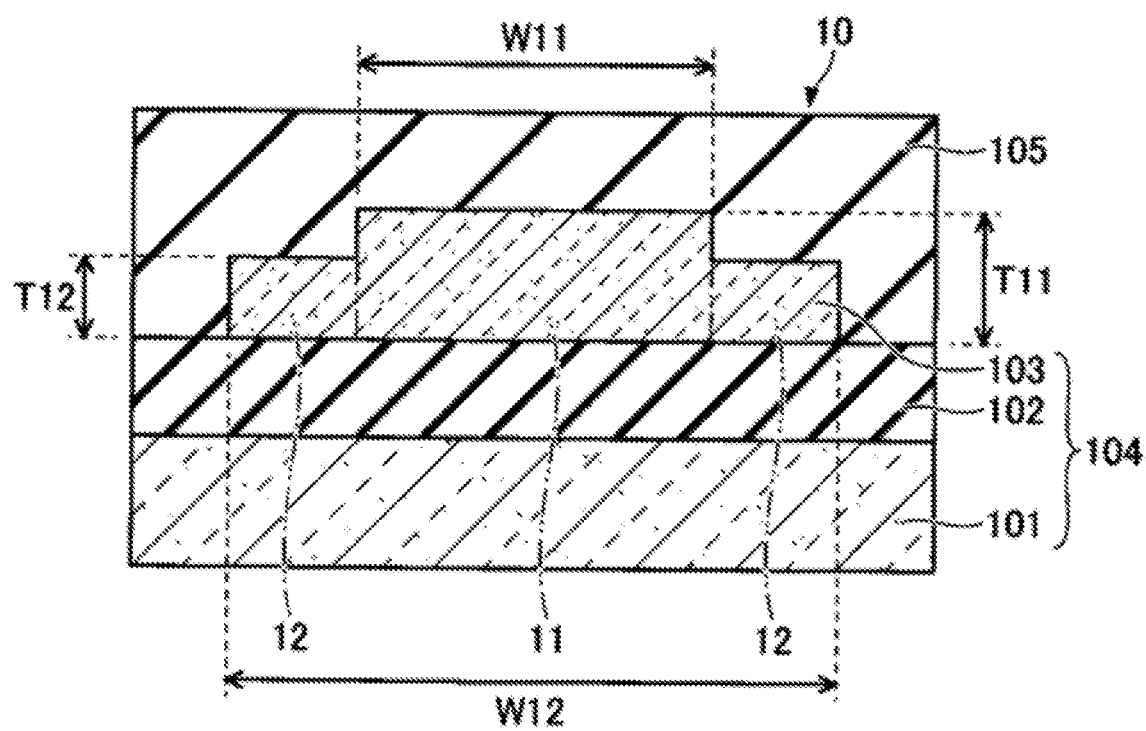
FIG. 6A is a cross-sectional view illustrating an example of a rib-type single mode waveguide.
Figure 6B:
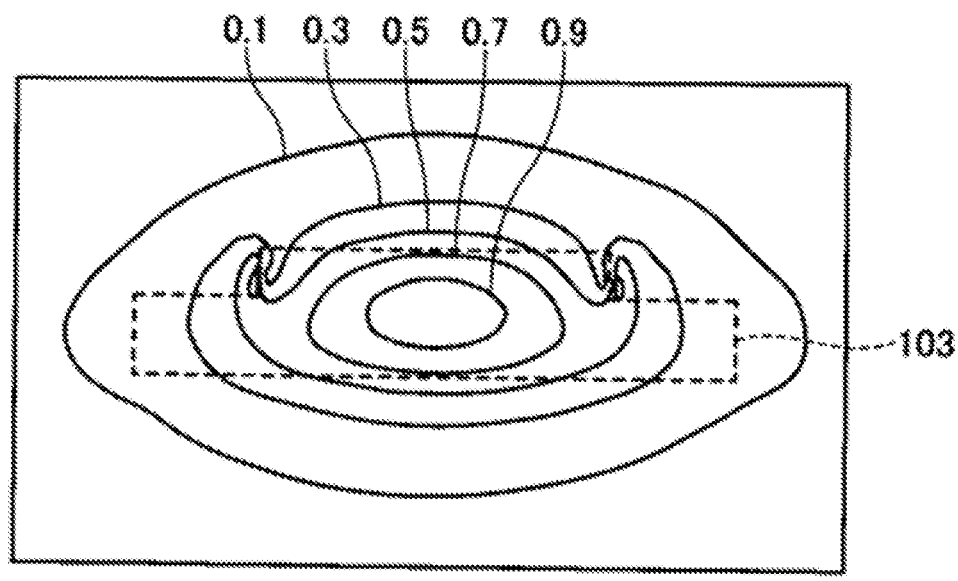
FIG. 6B is a diagram illustrating a simulation result of a mode distribution of the single mode waveguide illustrated in FIG. 6A.
Figure 7A:
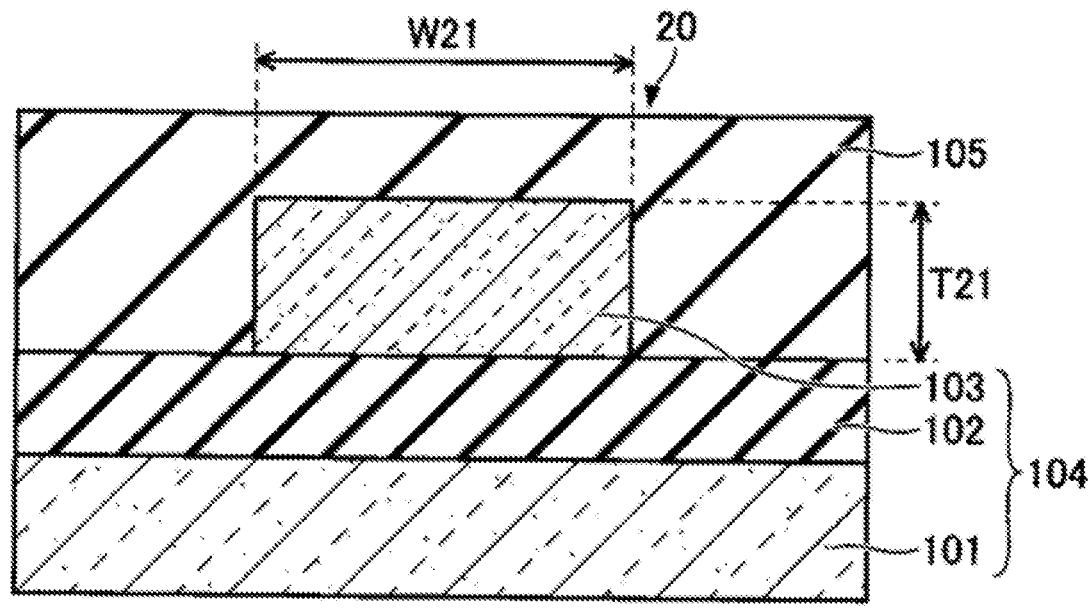
FIG. 7A is a cross-sectional view illustrating an example of a channel-type single mode waveguide.
Figure 7B:
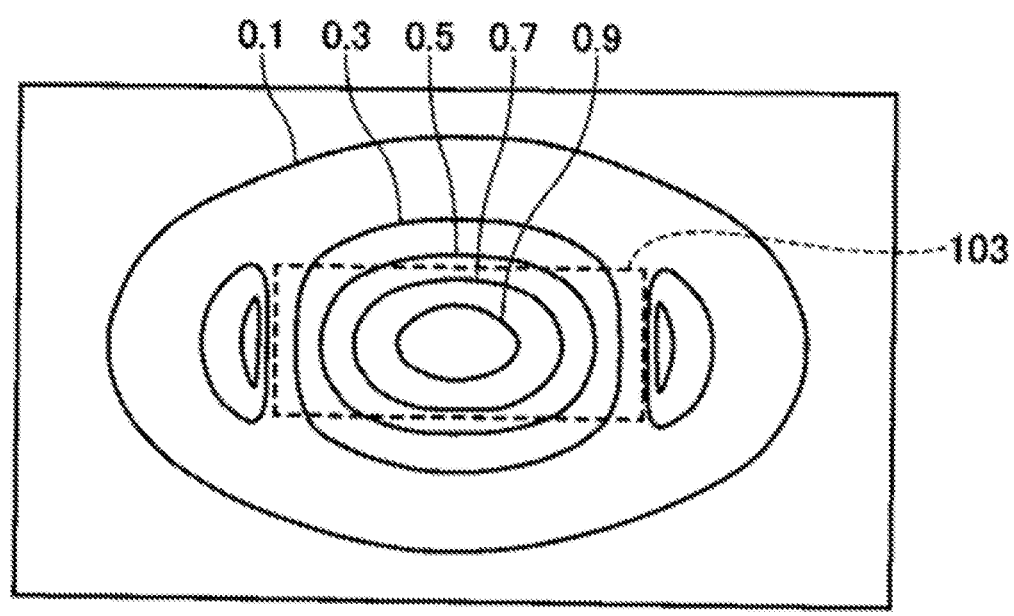
FIG. 7B is a diagram illustrating a simulation result of a mode distribution of the single mode waveguide illustrated in FIG. 7A.

Here, characteristics of a single mode waveguide will be described. FIG. 6A is a cross-sectional view illustrating an example of a rib-type single mode waveguide, and FIG. 6B is a diagram illustrating a simulation result of a mode distribution of the single mode waveguide illustrated in FIG. 6A. FIG. 7A is a cross-sectional view illustrating an example of a channel-type single mode waveguide, and FIG. 7B is a diagram illustrating a simulation result of a mode distribution of the single mode waveguide illustrated in FIG. 7A. The simulations were performed by a beam propagation method. Note that numerical values (0.1, 0.3, 0.5, 0.7 and 0.9) in FIGS. 6B and 7B indicate relative intensities when the maximum intensity is 1.0. The same applies to numerical values in the subsequent figures illustrating simulation results of mode distributions and electric field distributions.

A rib-type single mode waveguide 10 illustrated in FIG. 6A is configured using an SOI substrate 104 and a cladding layer 105. By processing a silicon layer 103, a core portion 11 and slab portions 12 are formed. A single mode waveguide 20 illustrated in FIG. 7A is configured using an SOI substrate 104 and a cladding layer 105. By processing a silicon layer 103, a core portion 21 is formed.

As illustrated in FIGS. 6B and 7B, generally, in the rib-type single mode waveguide 10, leakage of an optical mode to the cladding layer 105 is smaller than that in the channel-type single mode waveguide 20. Furthermore, in the single mode waveguide 10, a mode existence ratio on a side wall surface is smaller than that in the single mode waveguide 20. Thus, the single mode waveguide 10 is not easily affected by the rib width of the waveguide, fluctuation in an angle formed between the side wall surface and an upper surface of an insulating layer, and roughness of the side wall surface (side wall roughness).

The simulation results regarding an effective refractive index of each of the single mode waveguides 10 and 20 will be described. In the simulations, a thickness T11 of the core portion 11 of the single mode waveguide 10 is 220 nm, a distance W12 from an edge of one slab portion 12 to an edge of the other slab portion 12 (hereinafter sometimes referred to as "width of the slab portions 12") is 1 µm, and a thickness T21 of the core portion 21 of the single mode waveguide 20 is 220 nm.

Figure 8:
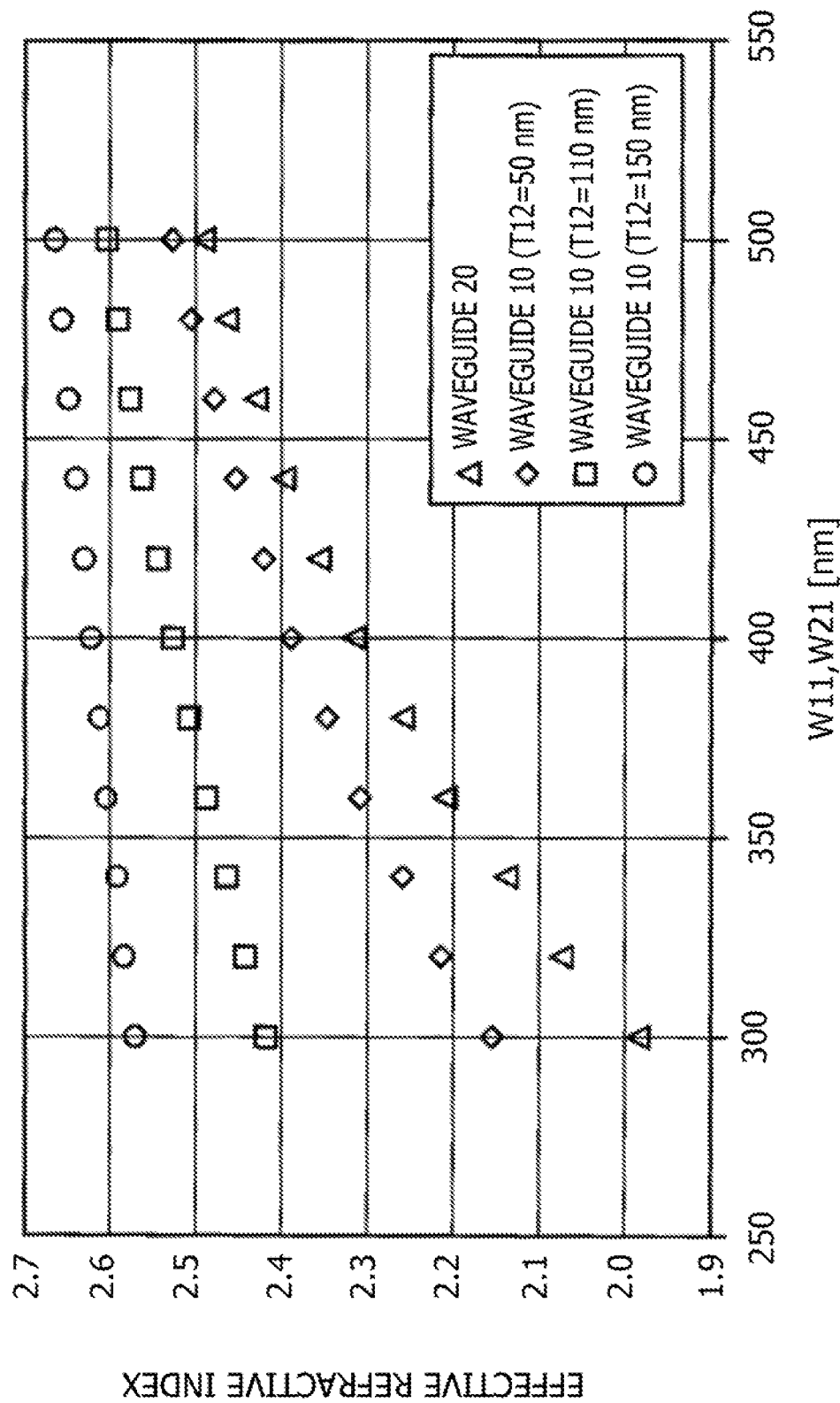
FIG. 8 is a diagram illustrating relationships between the widths of core portions and effective refractive indices.

For the single mode waveguide 10, a thickness T12 of the slab portions 12 was set to 50 nm, 110 nm, or 150 nm, and a relationship between a width W11 of the core portion 11 and an effective refractive index was calculated. For the single mode waveguide 20, a relationship between a width W21 of the core portion 21 and an effective refractive index was calculated. The results are illustrated in FIG. 8. FIG. 8 is a diagram illustrating the relationships between the widths W11 and W21 of the core portions and the effective refractive indices.

As illustrated in FIG. 8, the larger the thickness T12 (remained thickness) of the slab portion 12, the lower dependence of the effective refractive index on the width W11 of the core portion 11. For example, in a range of the widths W11 and W21 from 420 nm to 460 nm, a change rate of the effective refractive index when the thickness T12 is 50 nm is about 0.8 times a change rate of the effective refractive index of the single mode waveguide 20. In the range of the widths W11 and W21 from 420 nm to 460 nm, a change rate of the effective refractive index when the thickness T12 is 100 nm is about 0.48 times the change rate of the effective refractive index of the single mode waveguide 20, and a change rate of the effective refractive index when the thickness T12 is 150 nm is about 0.26 times the change rate of the effective refractive index of the single mode waveguide 20. Since the change rate of the effective refractive index corresponds to a rate of phase fluctuation, the greater the thickness T12, the smaller the rate of phase fluctuation.

In the first embodiment, the single mode waveguides 150, 160, 170 and 180 are rib-type single mode waveguides. Thus, the effective refractive indices of these single mode waveguides 150, 160, 170 and 180 are not easily affected by the widths and the thicknesses of the core portions 151, 161, 171 and 181, and fluctuations in angles formed between side wall surfaces and the upper surfaces 102A of the insulating layers 102. Furthermore, the single mode waveguides 150, 160, 170 and 180 are not easily affected by roughness of the side wall surfaces of the core portions 151, 161, 171 and 181 (side wall roughness). Therefore, it is possible to reduce an influence of manufacturing variations and significantly reduce phase errors.

Furthermore, in the above-described simulation results, characteristics relatively resistant to manufacturing variations are obtained even when the width W12 of the slab portions 12 is 1 µm. Furthermore, when a rib-type waveguide having the slab portion width of 1 µm is applied to a bending waveguide, a bending radius of the bending waveguide may be set to 10 µm to 20 µm. Therefore, even when a bending radius of each of the single mode waveguides 150, 160, 170 and 180 is set to 10 µm to 20 µm, characteristics resistant to manufacturing variations may be obtained.

Second Embodiment

Figure 9:
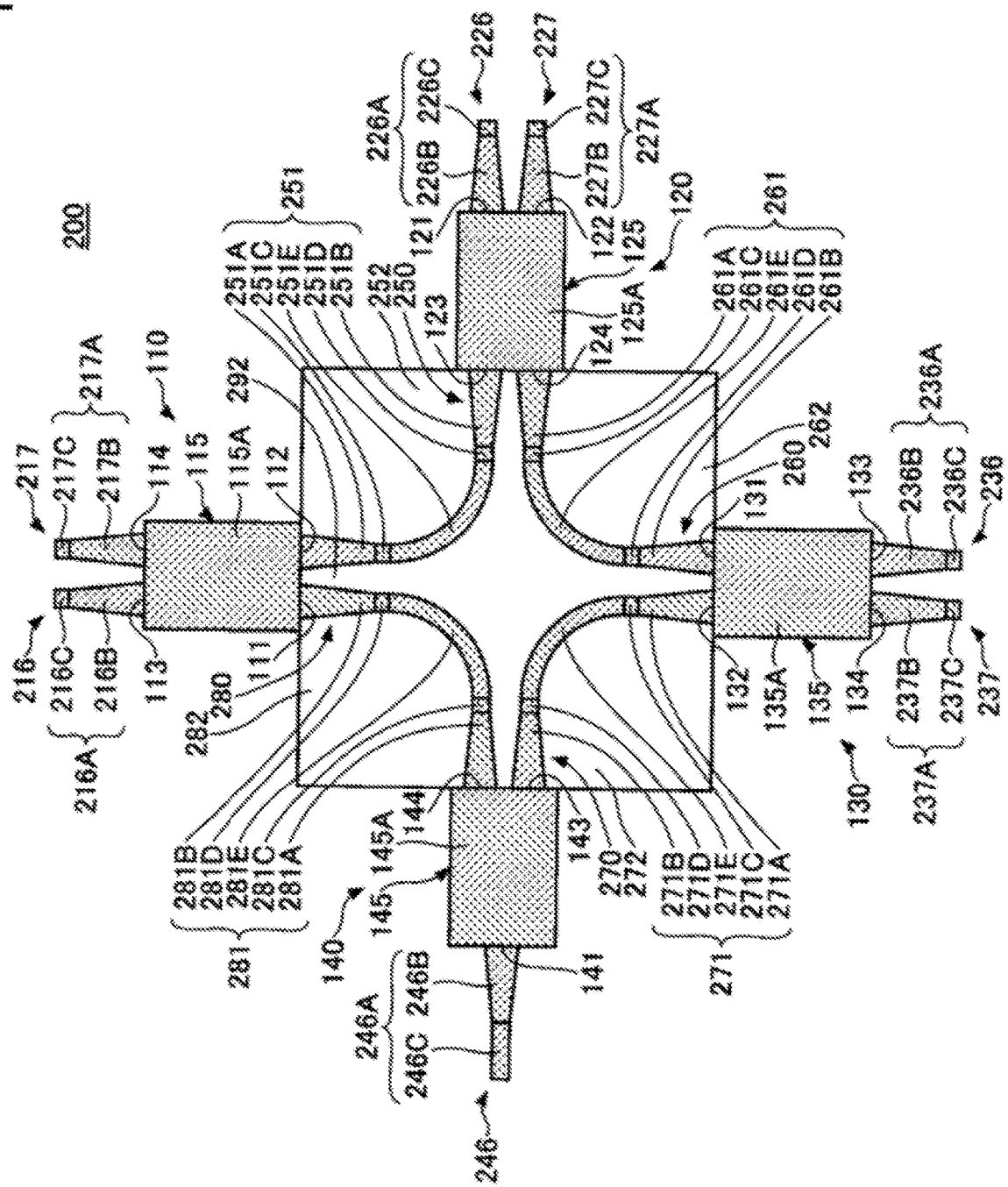
FIG. 9 is a perspective plan view illustrating an optical semiconductor device according to a second embodiment.

Next, a second embodiment will be described. The second embodiment differs from the first embodiment mainly in a configuration of a core portion of a rib-type single mode waveguide. FIG. 9 is a perspective plan view illustrating an optical semiconductor device according to the second embodiment.

As illustrated in FIG. 9, an optical semiconductor device 200 according to the second embodiment includes single mode waveguides 250, 260, 270 and 280 instead of the single mode waveguides 150, 160, 170 and 180 in the first embodiment. The single mode waveguide 250 is a rib-type single mode waveguide that optically connects an input port 112 and an output port 123. The single mode waveguide 260 is a rib-type single mode waveguide that optically connects an output port 124 and an input port 131. The single mode waveguide 270 is a rib-type single mode waveguide that optically connects an input port 132 and an output port 143. The single mode waveguide 280 is a rib-type single mode waveguide that optically connects an output port 144 and an input port 111. The single mode waveguide 250 is an example of the first single mode waveguide, the single mode waveguide 260 is an example of the second single mode waveguide, the single mode waveguide 270 is an example of the third single mode waveguide, and the single mode waveguide 280 is an example of the fourth single mode waveguide. Each of the single mode waveguides 250, 260, 270 and 280 may be formed over an upper surface 102A of an insulating layer 102.

The single mode waveguide 250 includes, for example, a core portion 251 and slab portions 252 and 292 extending from the core portion 251 in directions parallel to the upper surface 102A. The single mode waveguide 260 includes, for example, a core portion 261 and slab portions 262 and 292 extending from the core portion 261 in directions parallel to the upper surface 102A. The single mode waveguide 270 includes, for example, a core portion 271 and slab portions 272 and 292 extending from the core portion 271 in directions parallel to the upper surface 102A. The single mode waveguide 280 includes, for example, a core portion 281 and slab portions 282 and 292 extending from the core portion 281 in directions parallel to the upper surface 102A. The slab portion 292 may be shared by the single mode waveguides 250, 260, 270 and 280. The core portion 251 is an example of the first core portion, and the slab portions 252 and 292 are an example of the first slab portion. The core portion 261 is an example of the second core portion, and the slab portions 262 and 292 are an example of the second slab portion. The core portion 271 is an example of the third core portion, and the slab portions 272 and 292 are an example of the third slab portion. The core portion 281 is an example of the fourth core portion, and the slab portions 282 and 292 are an example of the fourth slab portion.

The core portion 251 includes a core taper portion 251A that is directly connected to the input port 112 and becomes narrower in width as the distance from the input port 112 increases, and a core taper portion 251B that is directly connected to the output port 123 and becomes narrower in width as the distance from the output port 123 increases. The core portion 251 may include a linear portion 251C directly connected to the core taper portion 251A, a linear portion 251D directly connected to the core taper portion 251B, and a curved portion 251E directly connected to the linear portions 251C and 251D. The core taper portion 251A is an example of a first core taper portion, and the core taper portion 251B is an example of a second core taper portion.

The core portion 261 includes a core taper portion 261A that is directly connected to the output port 124 and becomes narrower in width as the distance from the output port 124 increases, and a core taper portion 261B that is directly connected to the input port 131 and becomes narrower in width as the distance from the input port 131 increases. The core portion 261 may include a linear portion 261C directly connected to the core taper portion 261A, a linear portion 261D directly connected to the core taper portion 261B, and a curved portion 261E directly connected to the linear portions 261C and 261D. The core taper portion 261A is an example of a third core taper portion, and the core taper portion 261B is an example of a fourth core taper portion.

The core portion 271 includes a core taper portion 271A that is directly connected to the input port 132 and becomes narrower in width as the distance from the input port 132 increases, and a core taper portion 271B that is directly connected to the output port 143 and becomes narrower in width as the distance from the output port 143 increases. The core portion 271 may include a linear portion 271C directly connected to the core taper portion 271A, a linear portion 271D directly connected to the core taper portion 271B, and a curved portion 271E directly connected to the linear portions 271C and 271D. The core taper portion 271A is an example of a fifth core taper portion, and the core taper portion 2716 is an example of a sixth core taper portion.

The core portion 281 includes a core taper portion 281A that is directly connected to the output port 144 and becomes narrower in width as the distance from the output port 144 increases, and a core taper portion 281B that is directly connected to the input port 111 and becomes narrower in width as the distance from the input port 111 increases. The core portion 281 may include a linear portion 281C directly connected to the core taper portion 281A, a linear portion 281D directly connected to the core taper portion 281B, and a curved portion 281E directly connected to the linear portions 281C and 281D. The core taper portion 281A is an example of a seventh core taper portion, and the core taper portion 281B is an example of an eighth core taper portion.

In a plan view, the single mode waveguides 250, 260, 270 and 280 do not intersect each other. In the plan view, the slab portion 292 is inside the core portions 251, 261, 271 and 281. In the plan view, the slab portions 252, 262, 272 and 282 are outside the core portions 251, 261, 271 and 281. That is, for example, the slab portions 252, 262, 272 and 282 and the slab portion 292 are on opposite sides of the core portions 251, 261, 271 and 281.

The optical semiconductor device 200 includes single mode waveguides 216, 217, 226, 227, 236, 237 and 246 instead of the single mode waveguides 116, 117, 126, 127, 136, 137 and 146. The single mode waveguides 216, 217, 226, 227, 236, 237 and 246 are, for example, channel-type single mode waveguides.

The single mode waveguide 216 includes a core portion 216A and is optically connected to an output port 113. The core portion 216A includes a core taper portion 216B that is directly connected to the output port 113 and becomes narrower in width as the distance from the output port 113 increases, and a linear portion 216C directly connected to the core taper portion 216B.

The single mode waveguide 217 includes a core portion 217A and is optically connected to an output port 114. The core portion 217A includes a core taper portion 217B that is directly connected to the output port 114 and becomes narrower in width as the distance from the output port 114 increases, and a linear portion 217C directly connected to the core taper portion 217B.

The single mode waveguide 226 includes a core portion 226A and is optically connected to an input port 121. The core portion 226A includes a core taper portion 226B that is directly connected to the input port 121 and becomes narrower in width as the distance from the input port 121 increases, and a linear portion 226C directly connected to the core taper portion 226B.

The single mode waveguide 227 includes a core portion 227A and is optically connected to an input port 122. The core portion 227A includes a core taper portion 227B that is directly connected to the input port 122 and becomes narrower in width as the distance from the input port 122 increases, and a linear portion 227C directly connected to the core taper portion 227B.

The single mode waveguide 236 includes a core portion 236A and is optically connected to an output port 133. The core portion 236A includes a core taper portion 236B that is directly connected to the output port 133 and becomes narrower in width as the distance from the output port 133 increases, and a linear portion 236C directly connected to the core taper portion 236B.

The single mode waveguide 237 includes a core portion 237A and is optically connected to an output port 134. The core portion 237A includes a core taper portion 237B that is directly connected to the output port 134 and becomes narrower in width as the distance from the output port 134 increases, and a linear portion 237C directly connected to the core taper portion 237B.

The single mode waveguide 246 includes a core portion 246A and is optically connected to an input port 141. The core portion 246A includes a core taper portion 246B that is directly connected to the input port 141 and becomes narrower in width as the distance from the input port 141 increases, and a linear portion 246C directly connected to the core taper portion 246B.

Other configurations are similar to those of the first embodiment.

In the optical semiconductor device 200, for example, signal light is input from the single mode waveguide 226 or 227 to the input port 122 of a 2×2 MMI coupler 120. Furthermore, LO light is input from the single mode waveguide 246 to the input port 141 of a 1×2 MMI coupler 140. For example, wavelengths of the signal light and the LO light are each 1.55 μm. The signal light is branched into two by the 2×2 MMI coupler 120 and output from the output ports 123 and 124. The signal light output from the output port 123 is input to the input port 112 of a 2×2 MMI coupler 110 via the single mode waveguide 250, and the signal light output from the output port 124 is input to the input port 131 of a 2×2 MMI coupler 130 via the single mode waveguide 260. The LO light is branched into two by the 1×2 MMI coupler 140 and output from the output ports 143 and 144. The LO light output from the output port 143 is input to the input port 132 of the 2×2 MMI coupler 130 via the single mode waveguide 270, and the LO light output from the output port 144 is input to the input port 111 of the 2×2 MMI coupler 110 via the single mode waveguide 280. The 2×2 MMI coupler 110 combines the LO light input to the input port 111 and the signal light input to the input port 112, and outputs Q component signal light having a phase difference of 180 degrees from the output ports 113 and 114 to the single mode waveguides 216 and 217. The 2×2 MMI coupler 130 combines the LO light input to the input port 132 and the signal light input to the input port 131, and outputs I component signal light having a phase difference of 180 degrees from the output ports 133 and 134 to the single mode waveguides 236 and 237. In this way, four beams of signal light having phases shifted by 90 degrees are output from the optical semiconductor device 200.

For example, each of the linear portions 216C, 217C, 226C, 227C, 236C, 237C and 246C has the width of 440 nm and the thickness of 220 nm. For example, each of the core taper portions 216B, 217B, 226B, 227B, 236B, 237B and 246B has the narrow side width of 440 nm, the wide side width of 800 nm, and the length of 2 µm. For example, each of the core portions 115A, 125A, 135A and 145A has the width of 2.6 µm, the thickness of 220 nm, and the length of 5.65 µm. For example, each of the core taper portions 251A, 251B, 261A, 261B, 271A, 271B, 281A and 281B has the wide side width of 800 nm, the narrow side width of 440 nm, and the length of 2 µm. For example, each of the distance between the centers of the input port 111 and the input port 112, the distance between the centers of the output port 123 and the output port 124, the distance between the centers of the input port 131 and the input port 132, and the distance between the centers of the output port 143 and the output port 144 is 1.3 µm.

In the single mode waveguide 250, rib-channel conversion is performed in the core taper portions 251A and 251B. In the single mode waveguide 260, rib-channel conversion is performed in the core taper portions 261A and 261B. In the single mode waveguide 270, rib-channel conversion is performed in the core taper portions 271A and 271B. In the single mode waveguide 280, rib-channel conversion is performed in the core taper portions 281A and 281B. The second embodiment has a structure in which the input ports and the output ports of the MMI couplers are tapered as compared with the first embodiment, and with this structure, generally, reduction of insertion loss and improvement of wavelength band may be expected. Furthermore, in the second embodiment, reduction of loss in rib-channel conversion may be expected as compared with the first embodiment.

Figure 10A:
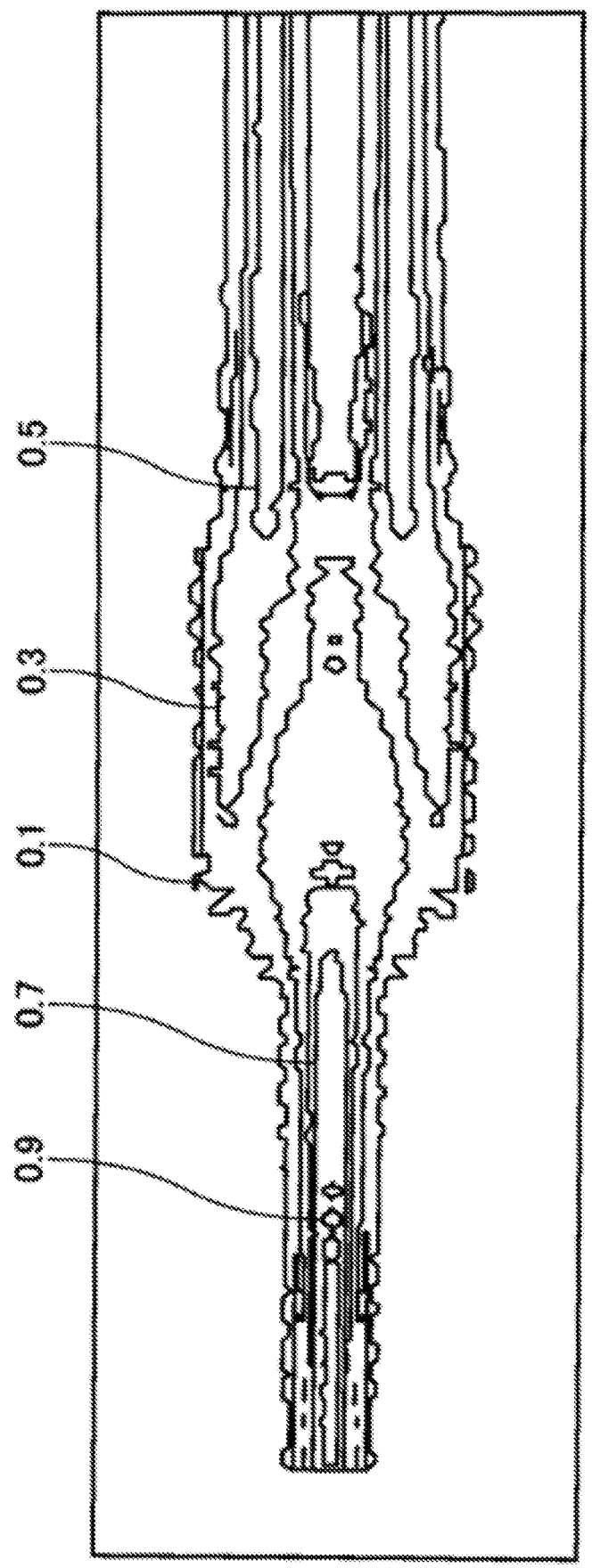
FIG. 10A is a diagram illustrating an electric field distribution when the channel-type single mode waveguide is connected.
Figure 10B:
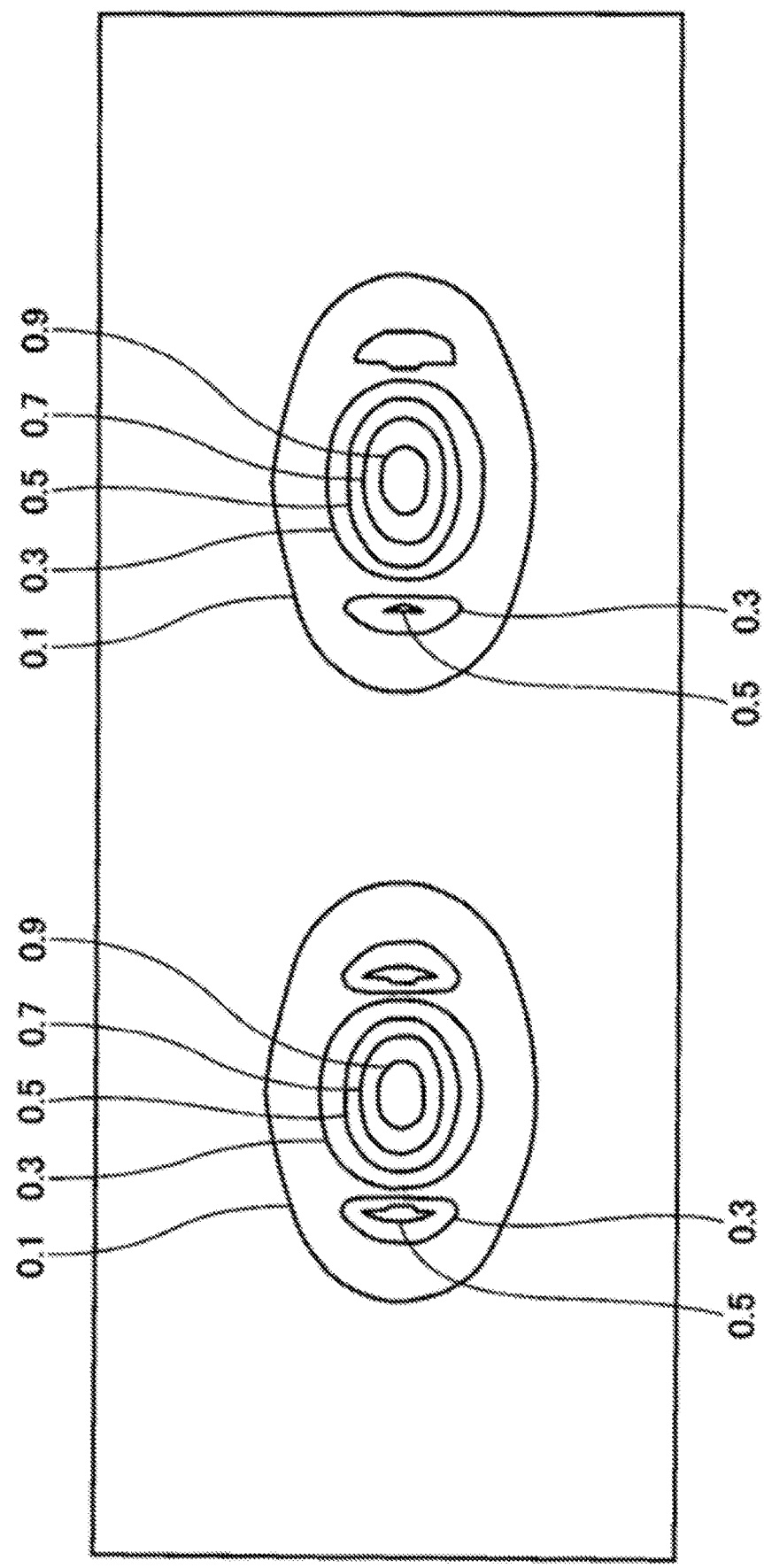
FIG. 10B is a diagram illustrating a mode distribution when the channel-type single mode waveguide is connected.
Figure 11A:
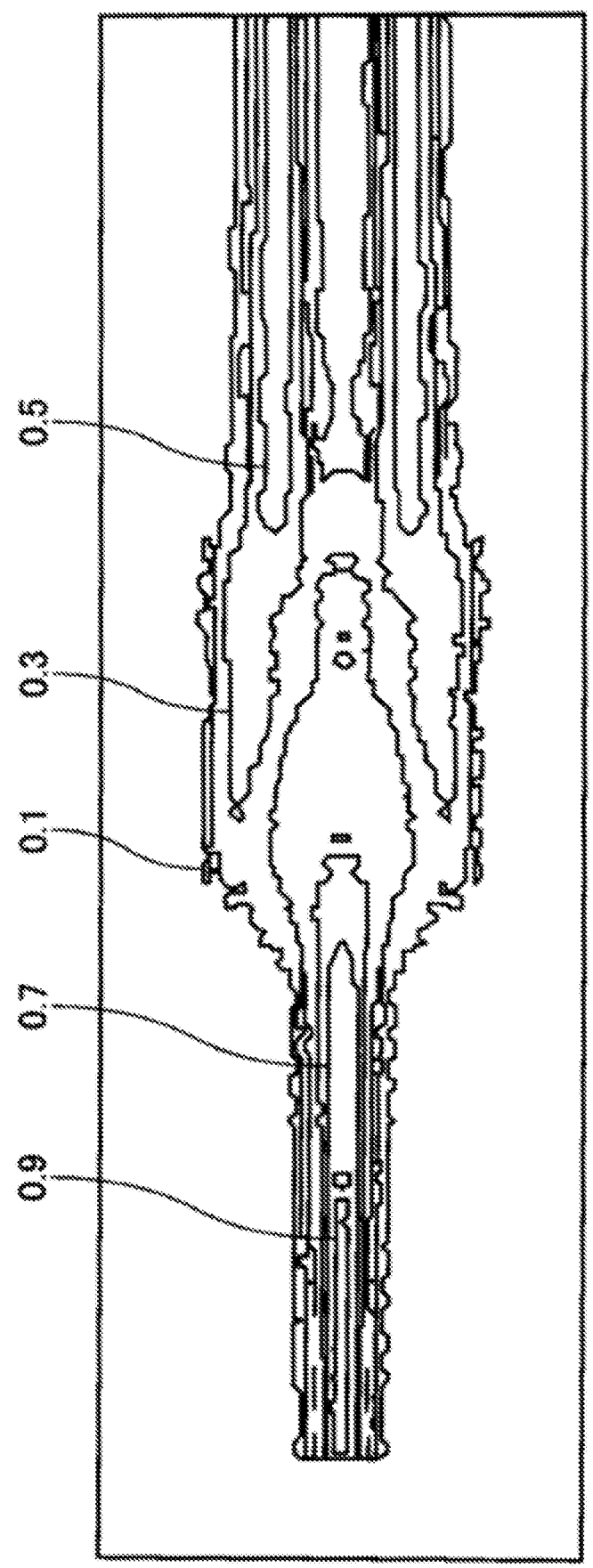
FIG. 11A is a diagram illustrating an electric field distribution when the rib-type single mode waveguide having the thickness of slab portions of 50 nm is connected, in relation to the second embodiment.
Figure 11B:
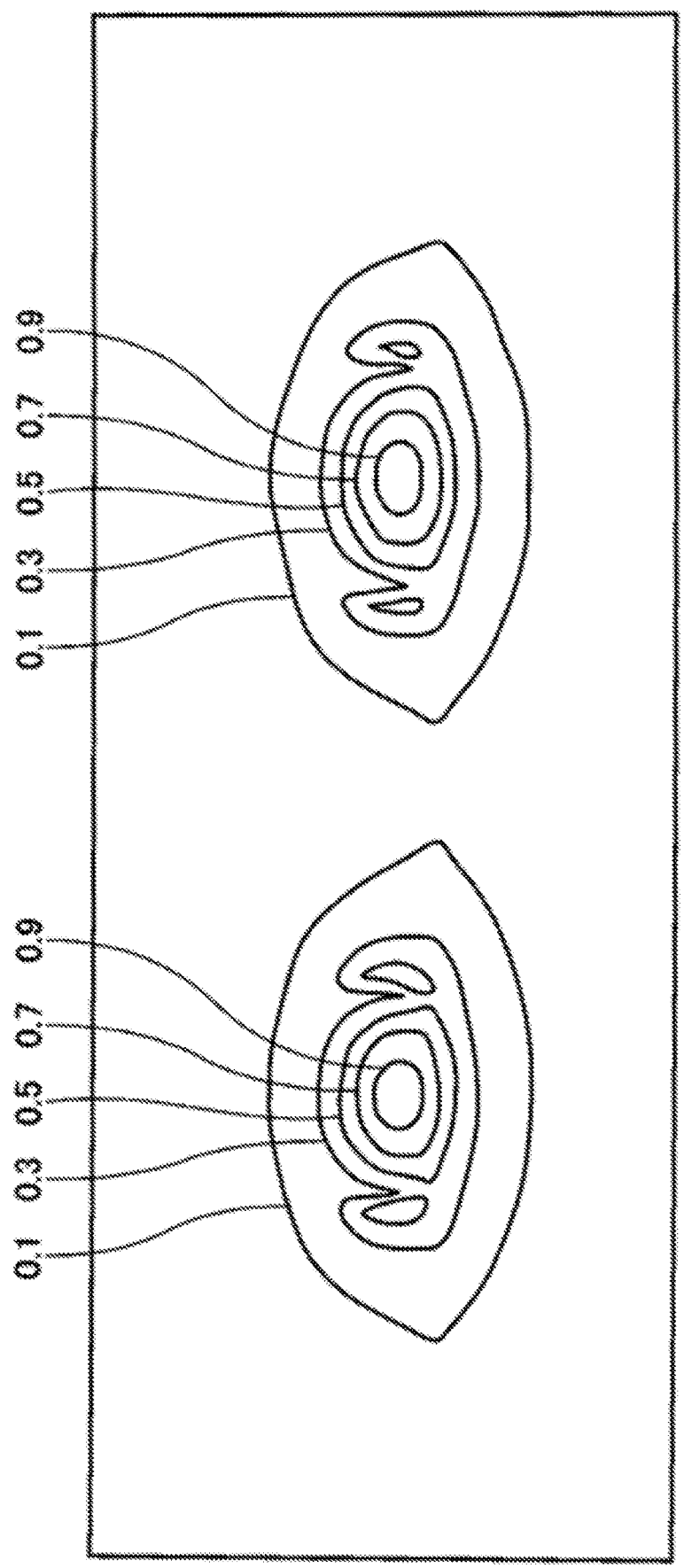
FIG. 11 is a diagram illustrating a mode distribution when the rib-type single mode waveguide having the thickness of the slab portions of 50 nm is connected, in relation to the second embodiment.
Figure 12A:
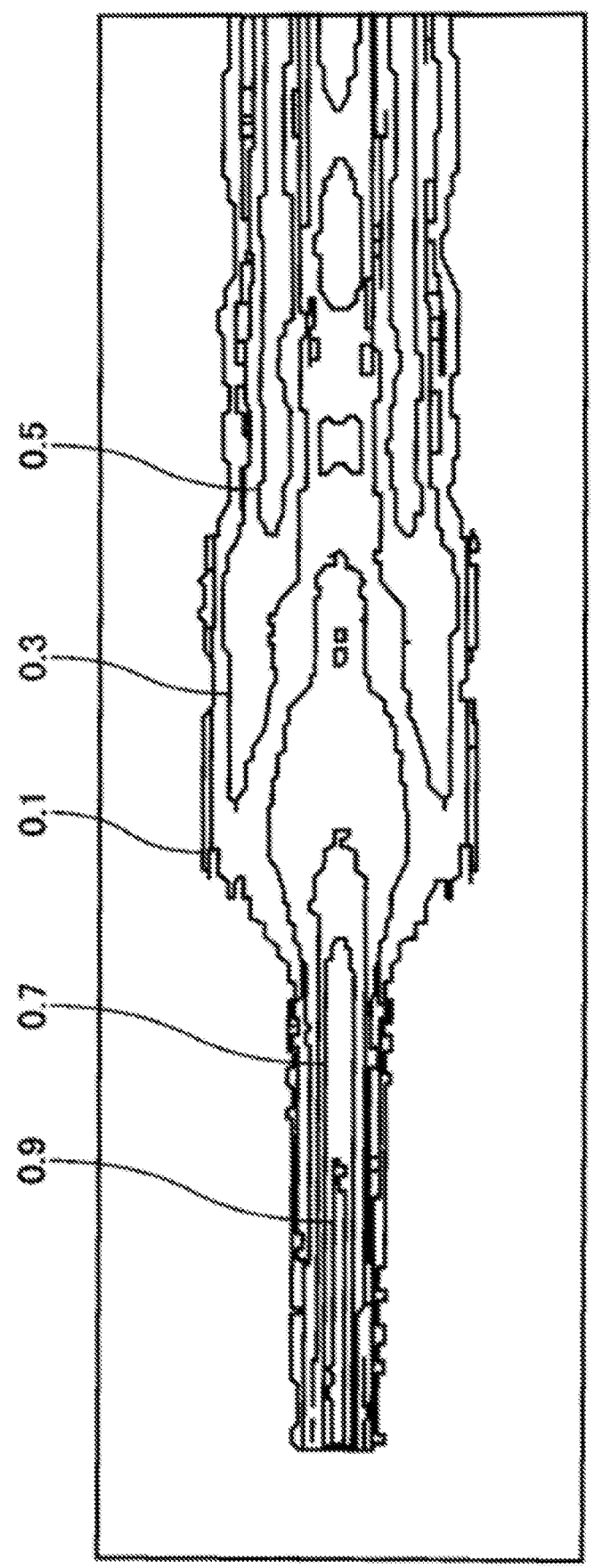
FIG. 12A is a diagram illustrating an electric field distribution when the rib-type single mode waveguide having the thickness of the slab portions of 110 nm is connected, in relation to the second embodiment.
Figure 13A:
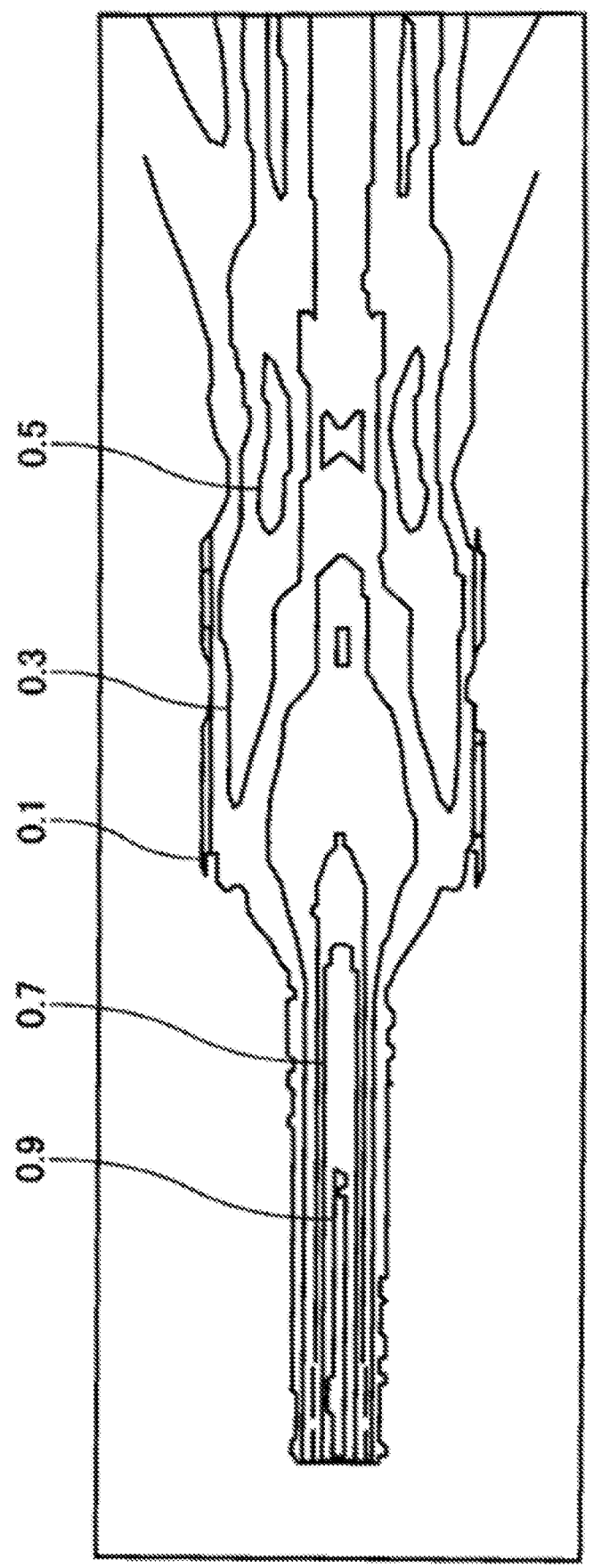
FIG. 13A is a diagram illustrating an electric field distribution when the rib-type single mode waveguide having the thickness of the slab portions of 150 nm is connected, in relation to the second embodiment.
Figure 14:
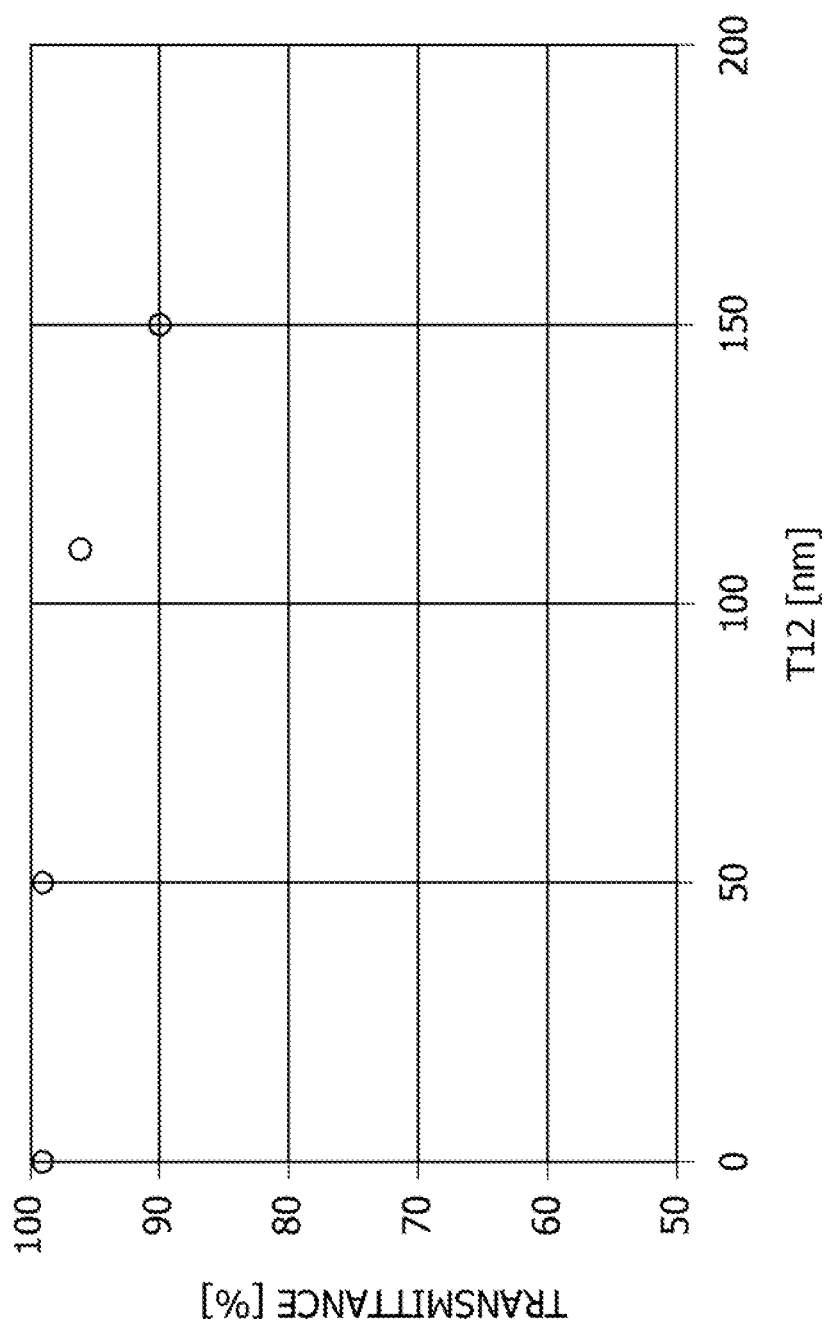
FIG. 14 is a diagram illustrating a relationship between the thickness and transmittance of the slab portions.

Here, in relation to the second embodiment, simulation results of characteristics of a 1×2 MMI coupler imitating the 1×2 MMI coupler 140 and the periphery of the 1×2 MMI coupler will be described. FIGS. 10A and 10B respectively illustrate an electric field distribution and a mode distribution when the channel-type single mode waveguide (see FIG. 7A) is connected to two output ports of the 1×2 MMI coupler. FIGS. 11A and 11B respectively illustrate an electric field distribution and a mode distribution when the rib-type single mode waveguide (see FIG. 6A) having the thickness T12 of 50 nm is connected to the two output ports of the 1×2 MMI coupler. FIGS. 12A and 12B respectively illustrate an electric field distribution and a mode distribution when the rib-type single mode waveguide (see FIG. 6A) having the thickness T12 of 110 nm is connected to the two output ports of the 1×2 MMI coupler. FIGS. 13A and 13B respectively illustrate an electric field distribution and a mode distribution when the rib-type single mode waveguide (see FIG. 6A) having the thickness T12 of 150 nm is connected to the two output ports of the 1×2 MMI coupler. FIG. 14 is a diagram illustrating a relationship between the thickness T12 and transmittance of the slab portions. Note that a single mode waveguide having the thickness T12 of 0 nm corresponds to the channel-type single mode waveguide. The simulations were performed by a beam propagation method.

As illustrated in FIGS. 10A to 13B, as the thickness T12 is smaller, mode coupling between adjacent single mode waveguides is less likely to occur, and radiation loss may be reduced. Furthermore, as illustrated in FIG. 14, at each boundary between a multimode waveguide and the single mode waveguide, it is possible to obtain transmittance of 91% when the thickness T12 is 150 nm, 97% when the thickness T12 is 110 nm, and over 99% when the thickness T12 is 50 nm. That is, for example, even when the rib-type single mode waveguide is used, transmittance of 90% or more may be obtained at each boundary between the multimode waveguide and the single mode waveguide. In particular, for example, the smaller the thickness T12, the better the transmittance may be obtained. Note that, for example, when the thickness T12 is 150 nm, mode coupling is particularly strong, and there is a high possibility that characteristics are adversely affected.

Third Embodiment

Figure 15:
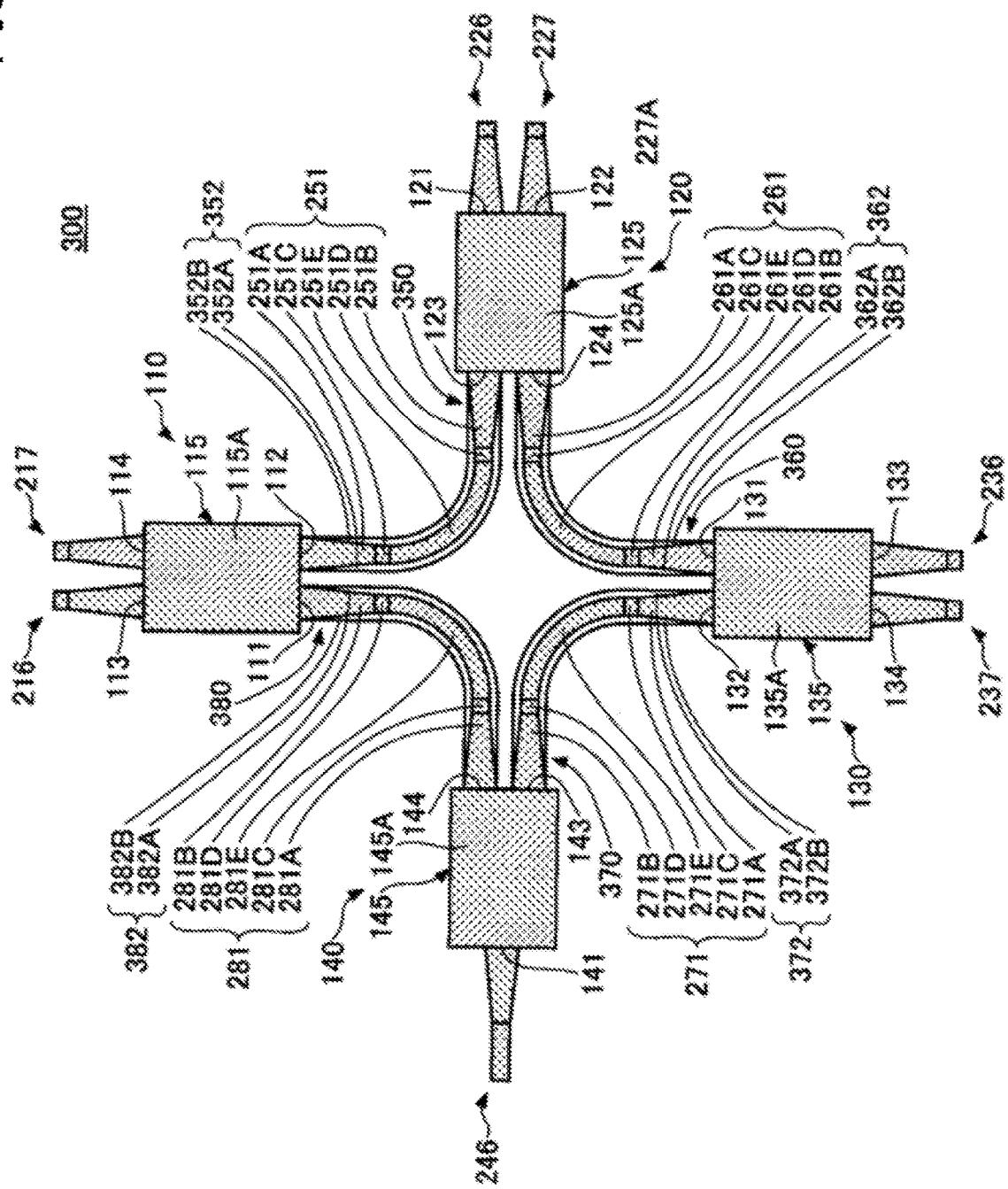
FIG. 15 is a perspective plan view illustrating an optical semiconductor device according to a third embodiment.

Next, a third embodiment will be described. The third embodiment differs from the second embodiment mainly in a configuration of a slab portion of a rib-type single mode waveguide. FIG. 15 is a perspective plan view illustrating an optical semiconductor device according to the third embodiment.

As illustrated in FIG. 15, an optical semiconductor device 300 according to the third embodiment includes single mode waveguides 350, 360, 370 and 380 instead of the single mode waveguides 250, 260, 270 and 280 in the second embodiment. The single mode waveguide 350 is a rib-type single mode waveguide that optically connects an input port 112 and an output port 123. The single mode waveguide 360 is a rib-type single mode waveguide that optically connects an output port 124 and an input port 131. The single mode waveguide 370 is a rib-type single mode waveguide that optically connects an input port 132 and an output port 143. The single mode waveguide 380 is a rib-type single mode waveguide that optically connects an output port 144 and an input port 111. The single mode waveguide 350 is an example of the first single mode waveguide, the single mode waveguide 360 is an example of the second single mode waveguide, the single mode waveguide 370 is an example of the third single mode waveguide, and the single mode waveguide 380 is an example of the fourth single mode waveguide. Each of the single mode waveguides 350, 360, 370 and 380 may be formed over an upper surface 102A of an insulating layer 102.

In a plan view, the single mode waveguides 350, 360, 370 and 380 do not intersect each other.

The single mode waveguide 350 includes, for example, a core portion 251 and slab portions 352A and 352B extending from the core portion 251 in directions parallel to the upper surface 102A. In the plan view, the slab portion 352A is on a side of the core portion 251 closer to core portions 261, 271 and 281, and the slab portion 352B is on the opposite side of the core portion 251 from the slab portion 352A. A pair of the slab portions 352A and 352B is included in a slab portion 352. The distance from an edge of the slab portion 352A to an edge of the slab portion 352B in the direction perpendicular to the propagation direction of light in the single mode waveguide 350 (hereinafter sometimes referred to as "width of the slab portion 352") is fixed. For example, the width of the slab portion 352 may be equal to the width of a core taper portion 251A at a connection portion with the input port 112 and the width of a core taper portion 251B at a connection portion with the output port 123. The slab portions 352A and 352B are an example of the first slab portion.

The single mode waveguide 360 includes, for example, a core portion 261 and slab portions 362A and 362B extending from the core portion 261 in directions parallel to the upper surface 102A. In the plan view, the slab portion 362A is on a side of the core portion 261 closer to the core portions 271, 281 and 251, and the slab portion 362B is on the opposite side of the core portion 261 from the slab portion 362A. A pair of the slab portions 362A and 362B is included in a slab portion 362. The distance from an edge of the slab portion 362A to an edge of the slab portion 362B in the direction perpendicular to the propagation direction of light in the single mode waveguide 360 (hereinafter sometimes referred to as "width of the slab portion 362") is fixed. For example, the width of the slab portion 362 may be equal to the width of a core taper portion 261A at a connection portion with the output port 124 and the width of a core taper portion 261B at a connection portion with the input port 131. The slab portions 362A and 362B are an example of the second slab portion.

The single mode waveguide 370 includes, for example, a core portion 271 and slab portions 372A and 372B extending from the core portion 271 in directions parallel to the upper surface 102A. In the plan view, the slab portion 372A is on a side of the core portion 271 closer to the core portions 281, 251 and 261, and the slab portion 372B is on the opposite side of the core portion 271 from the slab portion 372A. A pair of the slab portions 372A and 372B is included in a slab portion 372. The distance from an edge of the slab portion 372A to an edge of the slab portion 372 in the direction perpendicular to the propagation direction of light in the single mode waveguide 370 (hereinafter sometimes referred to as "width of the slab portion 372") is fixed. For example, the width of the slab portion 372 may be equal to the width of a core taper portion 271A at a connection portion with the input port 132 and the width of a core taper portion 271B at a connection portion with the output port 143. The slab portions 372A and 372B are an example of the third slab portion.

The single mode waveguide 380 includes, for example, a core portion 281 and slab portions 382A and 382B extending from the core portion 281 in directions parallel to the upper surface 102A. In the plan view, the slab portion 382A is on a side of the core portion 281 closer to the core portions 251, 261 and 271, and the slab portion 382B is on the opposite side of the core portion 281 from the slab portion 382A. A pair of the slab portions 382A and 382B is included in a slab portion 382. The distance from an edge of the slab portion 382A to an edge of the slab portion 382B in the direction perpendicular to the propagation direction of light in the single mode waveguide 380 (hereinafter sometimes referred to as "width of the slab portion 382") is fixed. For example, the width of the slab portion 382 may be equal to the width of a core taper portion 281A at a connection portion with the output port 144 and the width of a core taper portion 281B at a connection portion with the input port 111. The slab portions 382A and 382B are an example of the fourth slab portion.

The slab portions 352A, 362A, 372A and 382A are separated from each other. That is, for example, there is a gap between the slab portion 352A, the slab portion 362A, the slab portion 372A, and the slab portion 382A. For example, the width of the gap is about 500 nm at the narrowest part.

Other configurations are similar to those of the second embodiment.

In the optical semiconductor device 300, signal light is input from the single mode waveguide 226 or 227 to the input port 122 of a 2×2 MMI coupler 120. Furthermore, LO light is input from the single mode waveguide 246 to the input port 141 of a 1×2 MMI coupler 140. For example, wavelengths of the signal light and the LO light are each 1.55 μm. The signal light is branched into two by the 2×2 MMI coupler 120 and output from the output ports 123 and 124. The signal light output from the output port 123 is input to the input port 112 of a 2×2 MMI coupler 110 via the single mode waveguide 350, and the signal light output from the output port 124 is input to the input port 131 of a 2×2 MMI coupler 130 via the single mode waveguide 360. The LO light is branched into two by the 1×2 MMI coupler 140 and output from the output ports 143 and 144. The LO light output from the output port 143 is input to the input port 132 of the 2×2 MMI coupler 130 via the single mode waveguide 370, and the LO light output from the output port 144 is input to the input port 111 of the 2×2 MMI coupler 110 via the single mode waveguide 380. The 2×2 MMI coupler 110 combines the LO light input to the input port 111 and the signal light input to the input port 112, and outputs Q component signal light having a phase difference of 180 degrees from the output ports 113 and 114 to the single mode waveguides 216 and 217. The 2×2 MMI coupler 130 combines the LO light input to the input port 132 and the signal light input to the input port 131, and outputs I component signal light having a phase difference of 180 degrees from the output ports 133 and 134 to the single mode waveguides 236 and 237. In this way, four beams of signal light having phases shifted by 90 degrees are output from the optical semiconductor device 300.

In the third embodiment, the slab portions 352A, 362A, 372A and 382A are separated from each other, and there is a gap between the slab portion 352A, slab portion 362A, slab portion 372A, and slab portion 382A. Thus, mode coupling between the single mode waveguides 350, 360, 370 and 380 is unlikely to occur. Thus, radiation loss and characteristic degradation due to mode coupling may be further reduced.

Figure 16A:
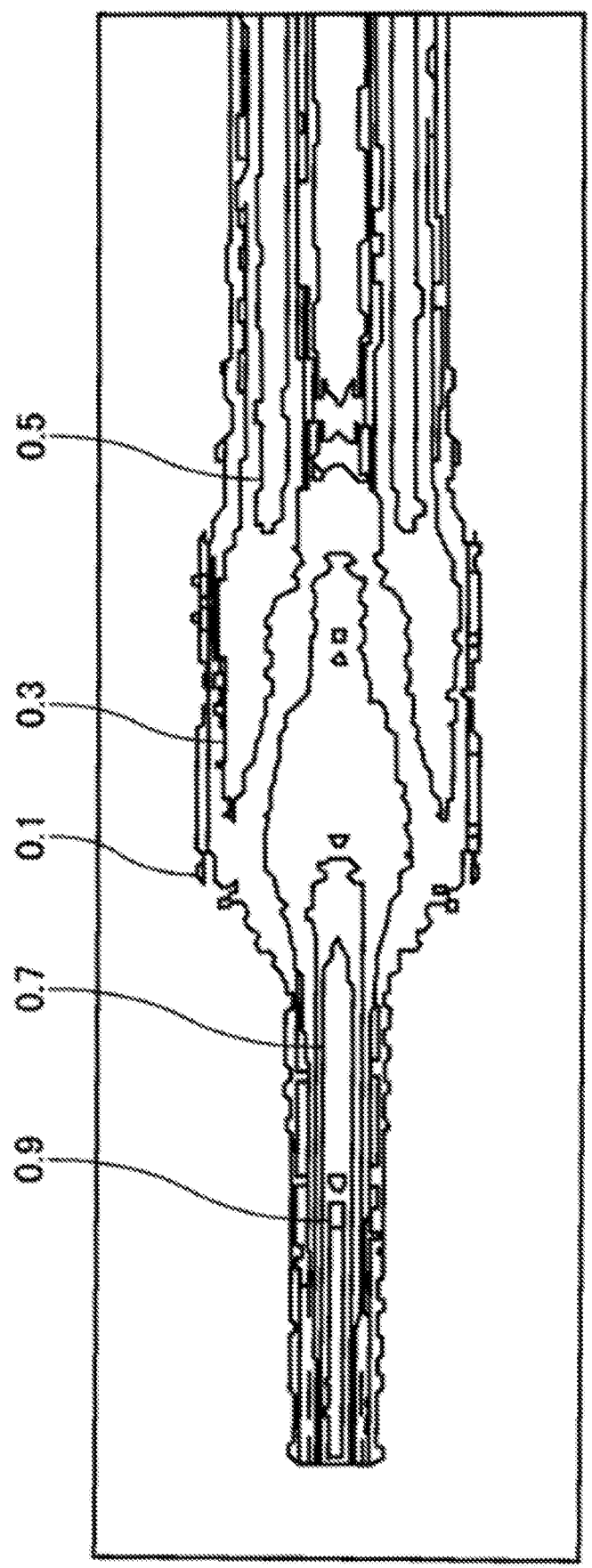
FIG. 16A is a diagram illustrating an electric field distribution when the rib-type single mode waveguide having the thickness of the slab portions of 150 nm is connected, in relation to the third embodiment.

Here, in relation to the third embodiment, simulation results of characteristics of a 1×2 MMI coupler imitating the 1×2 MMI coupler 140 and the periphery of the 1×2 MMI coupler will be described. FIGS. 16A and 16B respectively illustrate an electric field distribution and a mode distribution when the rib-type single mode waveguide (see FIG. 6A) having the thickness T12 of 150 nm is connected to two output ports of the 1×2 MMI coupler. The simulations were performed by a beam propagation method.

As illustrated in FIGS. 16A and 16B, even when the rib-type single mode waveguide having the thickness T12 of 150 nm is used, mode coupling between adjacent single mode waveguides is less likely to occur, and radiation loss may be reduced. Furthermore, transmittance of 99% or more may be obtained at each boundary between the multimode waveguide and the single mode waveguide. Therefore, it is easy to achieve both reduction of phase errors due to manufacturing variations and excellent transmittance.

Fourth Embodiment

Figure 17:
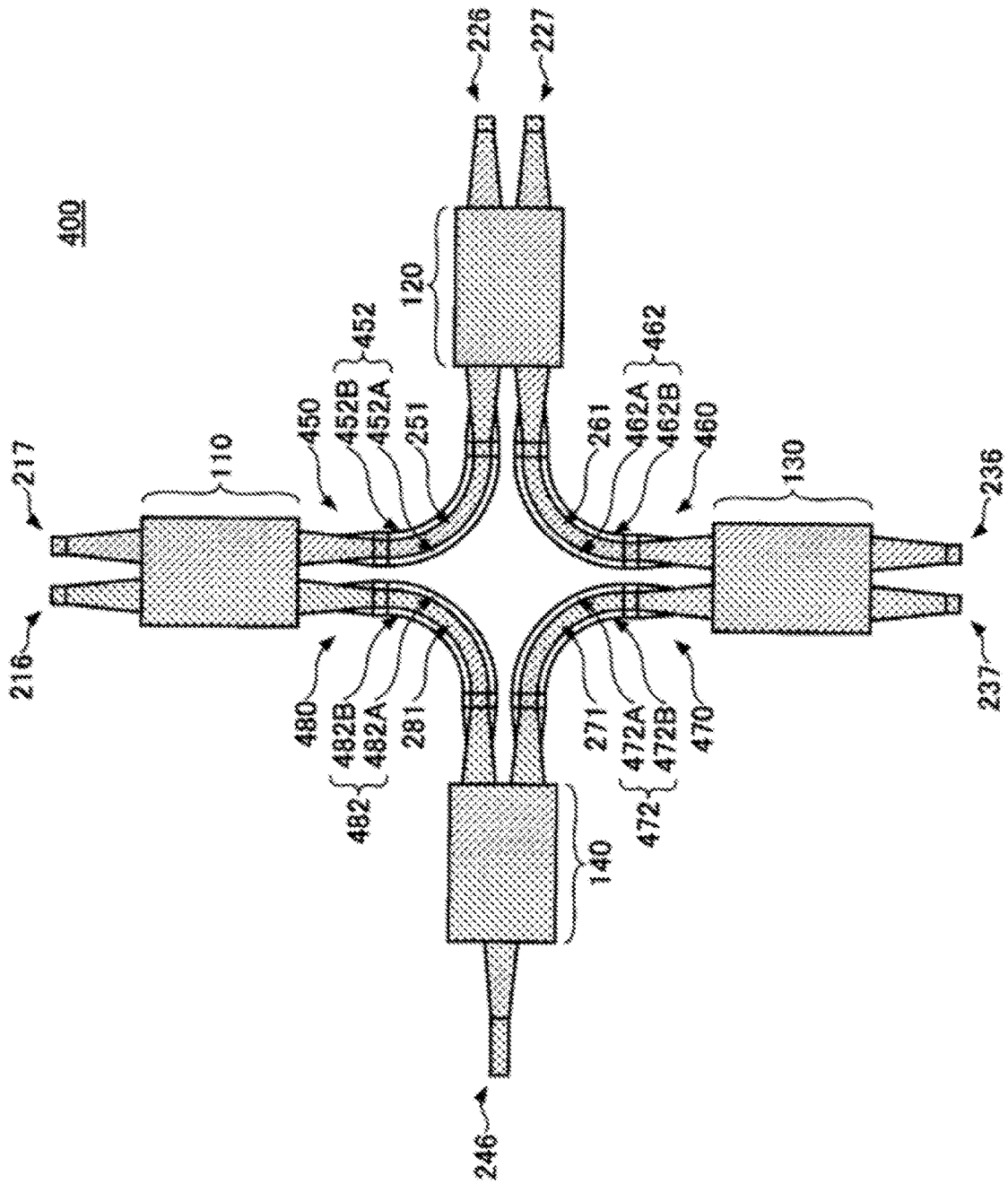
FIG. 17 is a perspective plan view illustrating an optical semiconductor device according to a fourth embodiment.

Next, a fourth embodiment will be described. The fourth embodiment differs from the third embodiment mainly in a configuration of a slab portion of a rib-type single mode waveguide. FIG. 17 is a perspective plan view illustrating an optical semiconductor device according to the fourth embodiment. FIGS. 18A to 18D are plan views each illustrating a part of FIG. 17 in an enlarged manner.

As illustrated in FIG. 17, an optical semiconductor device 400 according to the fourth embodiment includes single mode waveguides 450, 460, 470 and 480 instead of the single mode waveguides 350, 360, 370 and 380 in the third embodiment. The optical semiconductor device 400 includes slab portions 452A, 452B, 462A, 462B, 472A, 472B, 482A and 482B instead of the slab portions 352A, 3528, 362A, 362B, 372A, 372B, 382A and 382B in the third embodiment.

The single mode waveguide 450 includes, for example, a core portion 251 and the slab portions 452A and 452B extending from the core portion 251 in directions parallel to an upper surface 102A. In a plan view, the slab portion 452A is on a side of the core portion 251 closer to core portions 261, 271 and 281, and the slab portion 452B is on the opposite side of the core portion 251 from the slab portion 452A. A pair of the slab portions 452A and 452B is included in a slab portion 452. The slab portions 452A and 452B are an example of the first slab portion.

Figure 18A:
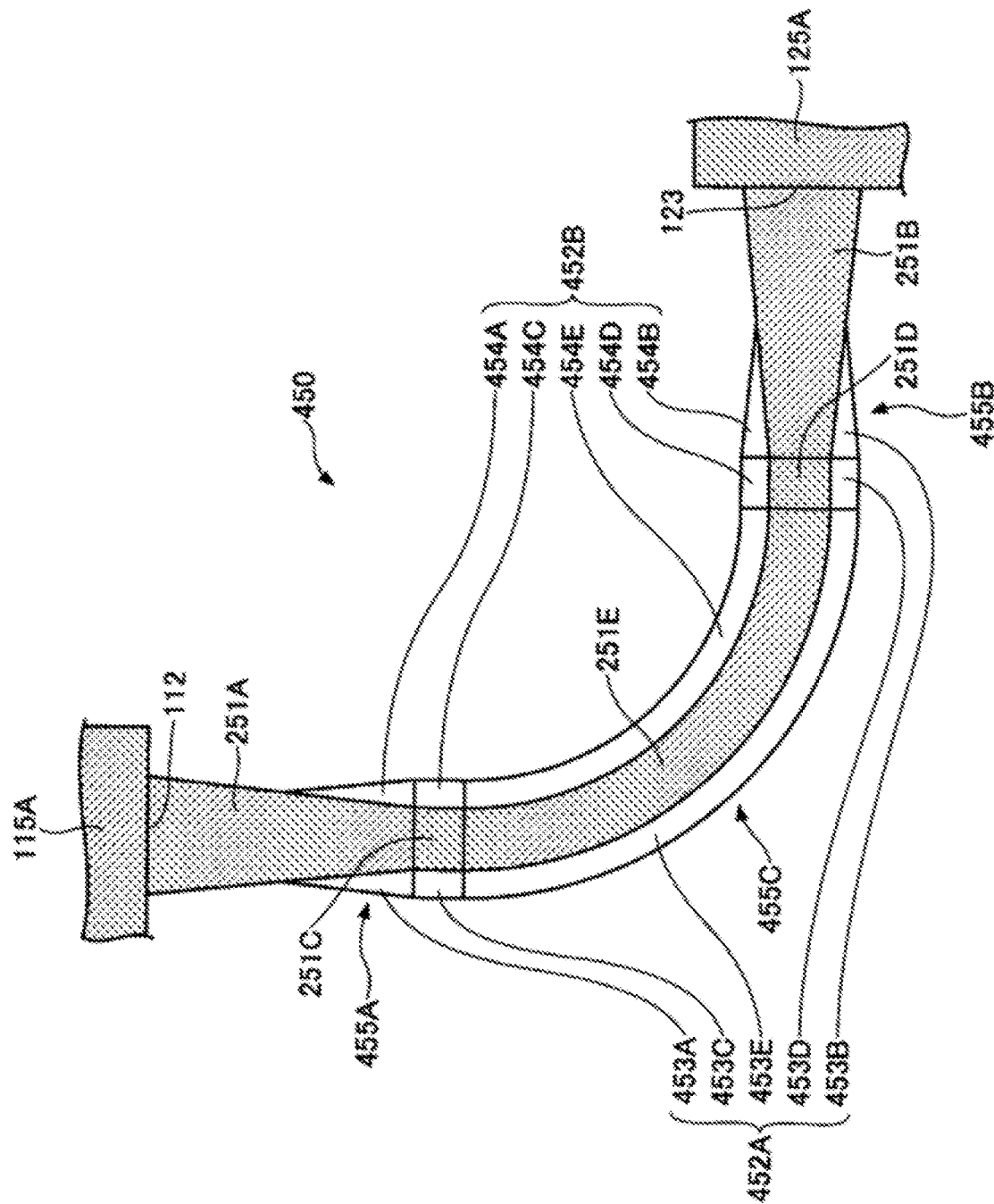
FIG. 18A is a plan view illustrating a part of FIG. 17 in an enlarged manner.

As illustrated in FIG. 18A, the slab portion 452A includes a taper portion 453A on a side of a part of a core taper portion 251A, a taper portion 453B on a side of a part of a core taper portion 2518, a linear portion 453C on a side of a linear portion 251C, a linear portion 453D on a side of a linear portion 251D, and a curved portion 453E on a side of a curved portion 251E. The slab portion 452B includes a taper portion 454A on a side of a part of the core taper portion 251A, a taper portion 454 on a side of a part of the core taper portion 251B, a linear portion 454C on a side of the linear portion 251C, a linear portion 454D on a side of the linear portion 251D, and a curved portion 454E on a side of the curved portion 251E. A pair of the taper portions 453A and 454A is included in a slab taper portion 455A. A pair of the taper portions 453B and 454B is included in a slab taper portion 455B. A pair of the linear portions 453C and 454C, a pair of the linear portions 453D and 454D, and a pair of the curved portions 453E and 454E are included in an equal width portion 455C.

The distance from each edge of the linear portion 453C, the curved portion 453E and the linear portion 453D to each edge of the linear portion 454C, the curved portion 454E and the linear portion 454D in the direction perpendicular to the propagation direction of light in the single mode waveguide 450 (hereinafter sometimes referred to as "width of the equal width portion 455C") is fixed. For example, the width of the equal width portion 455C may be equal to the width of the core taper portion 251A at a connection portion with an input port 112 and the width of the core taper portion 251B at a connection portion with an output port 123.

The distance from an edge of the taper portion 453A to an edge of the taper portion 454A in the direction perpendicular to the propagation direction of light in the single mode waveguide 450 (hereinafter sometimes referred to as "width of the slab taper portion 455A") is equal to the width of the equal width portion 455C at a boundary with the equal width portion 455C, and becomes smaller as the distance from the equal width portion 455C increases. The slab taper portion 455A is separated from the input port 112, and becomes wider in width as the distance from the input port 112 increases. The slab taper portion 455A is an example of a first slab taper portion.

The distance from an edge of the taper portion 453B to an edge of the taper portion 454B in the direction perpendicular to the propagation direction of light in the single mode waveguide 450 (hereinafter sometimes referred to as "width of the slab taper portion 455B") is equal to the width of the equal width portion 455C at a boundary with the equal width portion 455C, and becomes smaller as the distance from the equal width portion 455C increases. The slab taper portion 455B is separated from the output port 123, and becomes wider in width as the distance from the output port 123 increases. The slab taper portion 455B is an example of the first slab taper portion.

The single mode waveguide 460 includes, for example, the core portion 261 and the slab portions 462A and 462B extending from the core portion 261 in directions parallel to the upper surface 102A. In the plan view, the slab portion 462A is on a side of the core portion 261 closer to the core portions 271, 281 and 251, and the slab portion 462B is on the opposite side of the core portion 261 from the slab portion 462A. A pair of the slab portions 462A and 462B is included in a slab portion 462. The slab portions 462A and 462B are an example of the second slab portion.

Figure 18B:
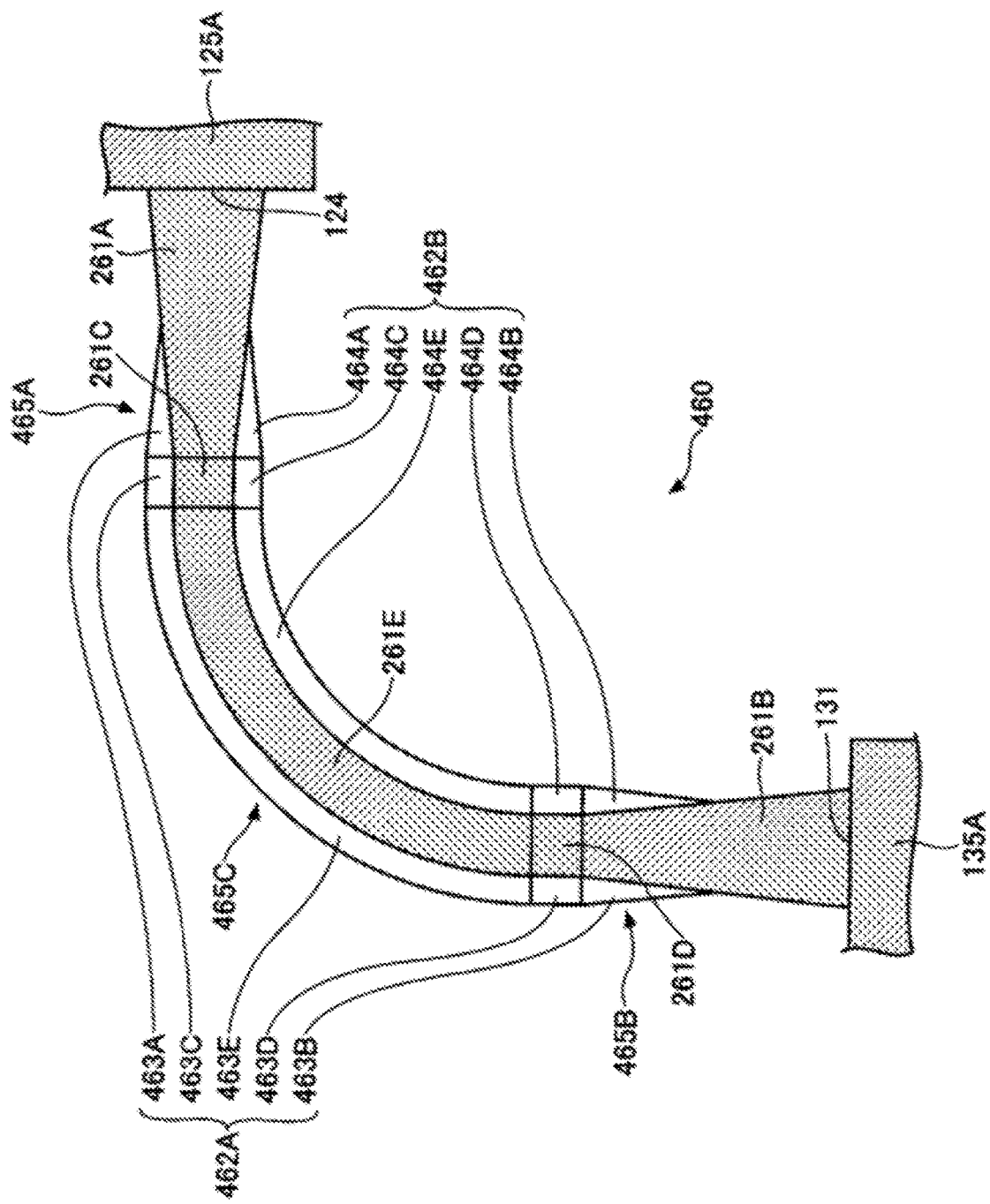
FIG. 18B is a plan view illustrating a part of FIG. 17 in an enlarged manner.

As illustrated in FIG. 18B, the slab portion 462A includes a taper portion 463A on a side of a part of a core taper portion 261A, a taper portion 463B on a side of a part of a core taper portion 261B, a linear portion 463C on a side of a linear portion 261C, a linear portion 463D on a side of a linear portion 261D, and a curved portion 463E on a side of a curved portion 261E. The slab portion 462B includes a taper portion 464A on a side of a part of the core taper portion 261A, a taper portion 464 on a side of a part of the core taper portion 261B, a linear portion 464C on a side of the linear portion 261C, a linear portion 464D on a side of the linear portion 261D, and a curved portion 464E on a side of the curved portion 261E. A pair of the taper portions 463A and 464A is included in a slab taper portion 465A. A pair of the taper portions 463B and 464B is included in a slab taper portion 465B. A pair of the linear portions 463C and 464C, a pair of the linear portions 463D and 464D, and a pair of the curved portions 463E and 464E are included in an equal width portion 465C.

The distance from each edge of the linear portion 463C, the curved portion 463E and the linear portion 463D to each edge of the linear portion 464C, the curved portion 464E and the linear portion 464D in the direction perpendicular to the propagation direction of light in the single mode waveguide 460 (hereinafter sometimes referred to as "width of the equal width portion 465C") is fixed. For example, the width of the equal width portion 465C may be equal to the width of the core taper portion 261A at a connection portion with an output port 124 and the width of the core taper portion 261B at a connection portion an the input port 131.

The distance from an edge of the taper portion 463A to an edge of the taper portion 464A in the direction perpendicular to the propagation direction of light in the single mode waveguide 460 (hereinafter sometimes referred to as "width of the slab taper portion 465A") is equal to the width of the equal width portion 465C at a boundary with the equal width portion 465C, and becomes smaller as the distance from the equal width portion 465C increases. The slab taper portion 465A is separated from the output port 124, and becomes wider in width as the distance from the output port 124 increases. The slab taper portion 465A is an example of a third slab taper portion.

The distance from an edge of the taper portion 463B to an edge of the taper portion 464B in the direction perpendicular to the propagation direction of light in the single mode waveguide 460 (hereinafter sometimes referred to as "width of the slab taper portion 465B") is equal to the width of the equal width portion 465C at a boundary with the equal width portion 465C, and becomes smaller as the distance from the equal width portion 465C increases. The slab taper portion 465B is separated from the input port 131, and becomes wider in width as the distance from the input port 131 increases. The slab taper portion 465B is an example of a fourth slab taper portion.

The single mode waveguide 470 includes, for example, the core portion 271 and the slab portions 472A and 472B extending from the core portion 271 in directions parallel to the upper surface 102A. In the plan view, the slab portion 472A is on a side of the core portion 271 closer to the core portions 281, 251 and 261, and the slab portion 472B is on the opposite side of the core portion 271 from the slab portion 472A. A pair of the slab portions 472A and 472B is included in a slab portion 472. The slab portions 472A and 472B are an example of the third slab portion.

As illustrated in FIG. 18C, the slab portion 472A includes a taper portion 473A on a side of a part of a core taper portion 271A, a taper portion 473B on a side of a part of a core taper portion 271B, a linear portion 473C on a side of a linear portion 271C, a linear portion 473D on a side of a linear portion 271D, and a curved portion 473E on a side of a curved portion 271E. The slab portion 472B includes a taper portion 474A on a side of a part of the core taper portion 271A, a taper portion 474B on a side of a part of the core taper portion 271B, a linear portion 474C on a side of the linear portion 271C, a linear portion 474D on a side of the linear portion 271D, and a curved portion 474E on a side of the curved portion 271E. A pair of the taper portions 473A and 474A is included in a slab taper portion 475A. A pair of the taper portions 473B and 474B is included in a slab taper portion 475B. A pair of the linear portions 473C and 474C, a pair of the linear portions 473D and 474D, and a pair of the curved portions 473E and 474E are included in an equal width portion 475C.

The distance from each edge of the linear portion 473C, the curved portion 473E and the linear portion 473D to each edge of the linear portion 474C, the curved portion 474E and the linear portion 474D in the direction perpendicular to the propagation direction of light in the single mode waveguide 470 (hereinafter sometimes referred to as "width of the equal width portion 475C") is fixed. For example, the width of the equal width portion 475C may be equal to the width of the core taper portion 271A at a connection portion with an input port 132 and the width of the core taper portion 271B at a connection portion with an output port 143.

The distance from an edge of the taper portion 473A to an edge of the taper portion 474A in the direction perpendicular to the propagation direction of light in the single mode waveguide 470 (hereinafter sometimes referred to as "width of the slab taper portion 475A") is equal to the width of the equal width portion 475C at a boundary with the equal width portion 475C, and becomes smaller as the distance from the equal width portion 475C increases. The slab taper portion 475A is separated from the input port 132, and becomes wider in width as the distance from the input port 132 increases. The slab taper portion 475A is an example of a fifth slab taper portion.

The distance from an edge of the taper portion 473B to an edge of the taper portion 474B in the direction perpendicular to the propagation direction of light in the single mode waveguide 470 (hereinafter sometimes referred to as "width of the slab taper portion 475B") is equal to the width of the equal width portion 475C at a boundary with the equal width portion 475C, and becomes smaller as the distance from the equal width portion 475C increases. The slab taper portion 475B is separated from the output port 143, and becomes wider in width as the distance from the output port 143 increases. The slab taper portion 475B is an example of a sixth slab taper portion.

The single mode waveguide 480 includes, for example, the core portion 281 and the slab portions 482A and 482B extending from the core portion 281 in directions parallel to the upper surface 102A. In the plan view, the slab portion 482A is on a side of the core portion 281 closer to the core portions 251, 261 and 271, and the slab portion 482B is on the opposite side of the core portion 281 from the slab portion 482A. A pair of the slab portions 482A and 482B is included in a slab portion 482. The slab portions 482A and 482B are an example of the fourth slab portion.

Figure 18D:
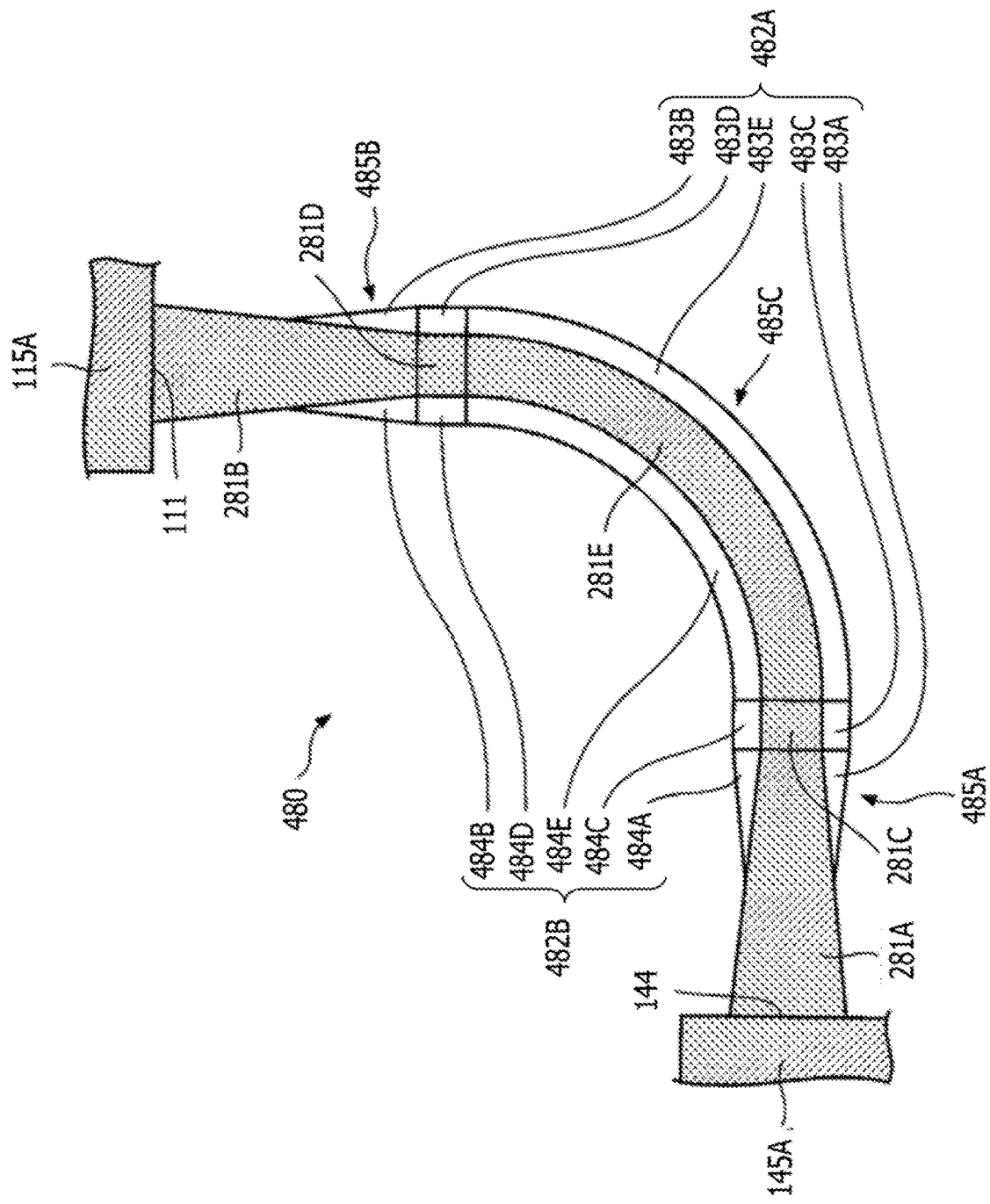
FIG. 18D is a plan view illustrating a part of FIG. 17 in an enlarged manner.

As illustrated in FIG. 18D, the slab portion 482A includes a taper portion 483A on a side of a part of a core taper portion 281A, a taper portion 483B on a side of a part of a core taper portion 281B, a linear portion 483C on a side of a linear portion 281C, a linear portion 483D on a side of a linear portion 281D, and a curved portion 483E on a side of a curved portion 281E. The slab portion 482 includes a taper portion 484A on a side of a part of the core taper portion 281A, a taper portion 484B on a side of a part of the core taper portion 281B, a linear portion 484C on a side of the linear portion 281C, a linear portion 484D on a side of the linear portion 281D, and a curved portion 484E on a side of the curved portion 281E. A pair of the taper portions 483A and 484A is included in a slab taper portion 485A. A pair of the taper portions 483B and 484B is included in a slab taper portion 485B. A pair of the linear portions 483C and 484C, a pair of the linear portions 483D and 484D, and a pair of the curved portions 483E and 484E are included in an equal width portion 485C.

The distance from each edge of the linear portion 483C, the curved portion 483E and the linear portion 483D to each edge of the linear portion 484C, the curved portion 484E and the linear portion 484D in the direction perpendicular to the propagation direction of light in the single mode waveguide 480 (hereinafter sometimes referred to as "width of the equal width portion 485C") is fixed. For example, the width of the equal width portion 485C may be equal to the width of the core taper portion 281A at a connection portion with an output port 144 and the width of the core taper portion 281B at a connection portion with an input port 111.

The distance from an edge of the taper portion 483A to an edge of the taper portion 484A in the direction perpendicular to the propagation direction of light in the single mode waveguide 480 (hereinafter sometimes referred to as "width of the slab taper portion 485A") is equal to the width of the equal width portion 485C at a boundary with the equal width portion 485C, and becomes smaller as the distance from the equal width portion 485C increases. The slab taper portion 485A is separated from the output port 144, and becomes wider in width as the distance from the output port 144 increases. The slab taper portion 485A is an example of a seventh slab taper portion.

The distance from an edge of the taper portion 483B to an edge of the taper portion 484B in the direction perpendicular to the propagation direction of light in the single mode waveguide 480 (hereinafter sometimes referred to as "width of the slab taper portion 485B") is equal to the width of the equal width portion 485C at a boundary with the equal width portion 485C, and becomes smaller as the distance from the equal width portion 485C increases. The slab taper portion 485B is separated from the input port 111, and becomes wider in width as the distance from the input port 111 increases. The slab taper portion 485B is an example of an eighth slab taper portion.

The slab portions 452A, 462A, 472A and 482A are separated from each other. That is, for example, there is a gap between the slab portion 452A, the slab portion 462A, the slab portion 472A, and the slab portion 482A.

Other configurations are similar to those of the third embodiment.

In the fourth embodiment, the single mode waveguide 450 includes the slab taper portions 455A and 455B, the single mode waveguide 460 includes the slab taper portions 465A and 465B, the single mode waveguide 470 includes the slab taper portions 475A and 4756, and the single mode waveguide 480 includes the slab taper portions 485A and 485B. These slab taper portions each has a taper structure opposite to that of the core taper portion in a plan view. Thus, according to the fourth embodiment, it is possible to reduce loss due to mode mismatch between multimode waveguides 115, 125, 135 and 145 and the single mode waveguides 450, 460, 470 and 480. That is, for example, according to the fourth embodiment, it is possible to reduce radiation loss by adiabatic changes in modes between the multimode waveguides 115, 125, 135 and 145 and the single mode waveguides 450, 460, 470 and 480.

Figure 19A:
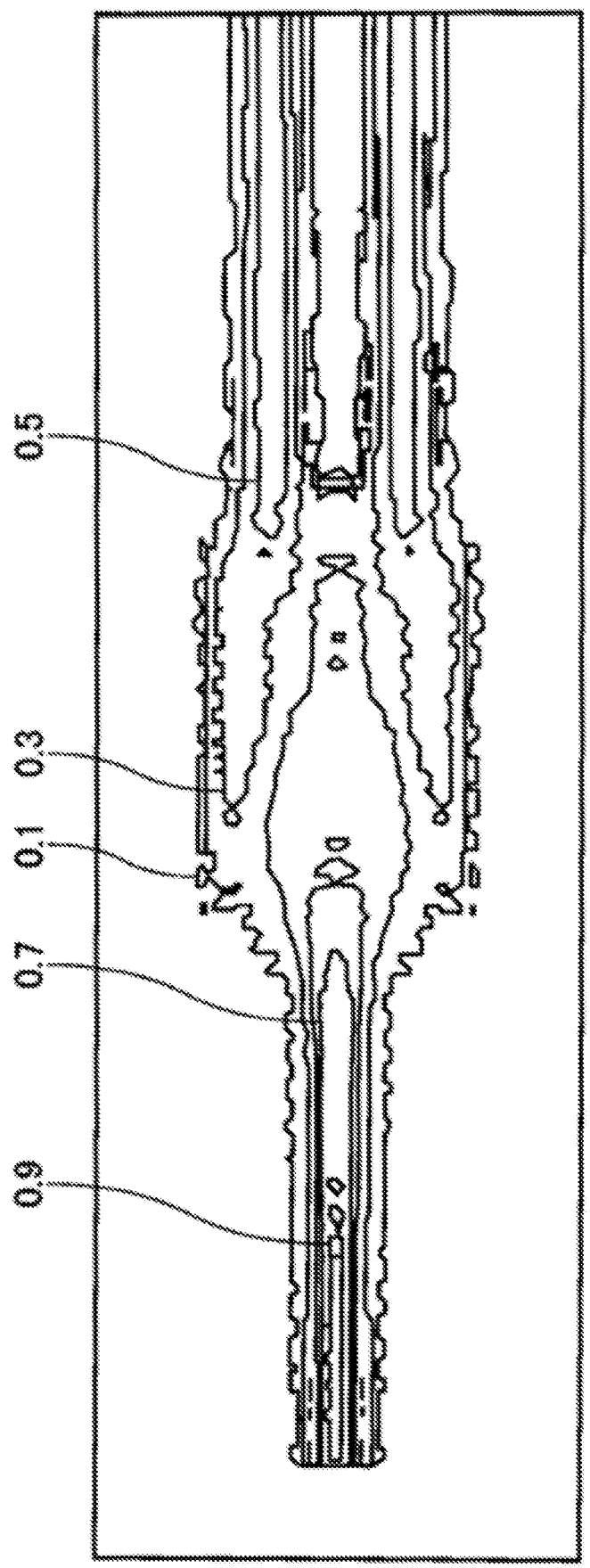
FIG. 19A is a diagram illustrating an electric field distribution when the rib-type single mode waveguide having the thickness of the slab portions of 150 nm is connected, in relation to the fourth embodiment.

Here, in relation to the fourth embodiment, simulation results of characteristics of a 1×2 MMI coupler imitating a 1×2 MMI coupler 140 and the periphery of the 1×2 MMI coupler will be described. FIGS. 19A and 19B respectively illustrate an electric field distribution and a mode distribution when the rib-type single mode waveguide (see FIG. 6A) having the thickness T12 of 150 nm is connected to two output ports of the 1×2 MMI coupler. The simulations were performed by a beam propagation method.

As illustrated in FIGS. 19A and 19B, even when the rib-type single mode waveguide having the thickness T12 of 150 nm is used, mode coupling between adjacent single mode waveguides is less likely to occur, and radiation loss may be reduced. Furthermore, transmittance of 99% or more may be obtained at each boundary between the multimode waveguide and the single mode waveguide. Therefore, it is easy to achieve both reduction of phase errors due to manufacturing variations and excellent transmittance.

Fifth Embodiment

Figure 20:
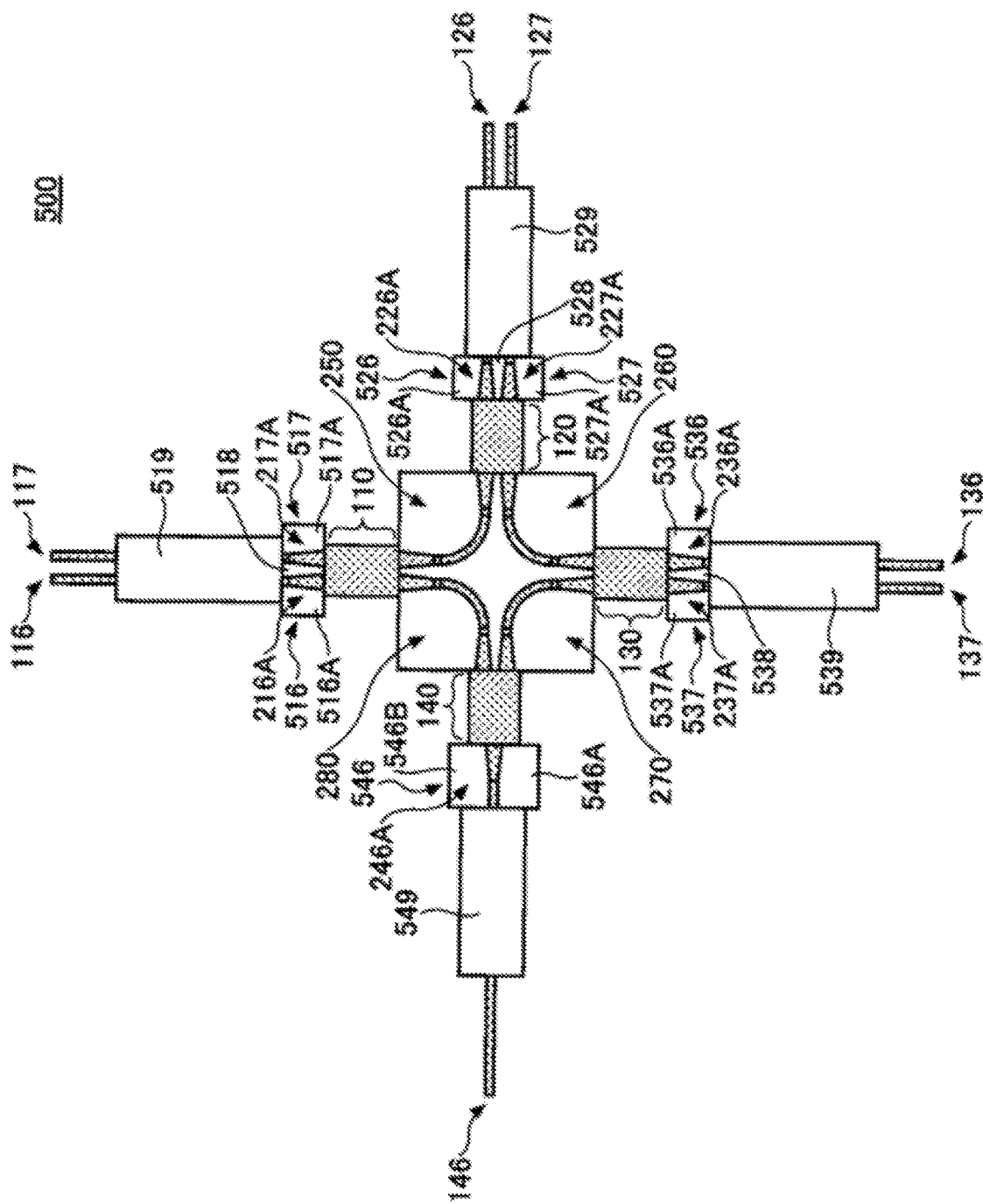
FIG. 20 is a perspective plan view illustrating an optical semiconductor device according to a fifth embodiment.

Next, a fifth embodiment will be described. The fifth embodiment differs from the second embodiment mainly in a configuration of a slab portion of a channel-type single mode waveguide outside an MMI coupler. FIG. 20 is a perspective plan view illustrating an optical semiconductor device according to the fifth embodiment.

As illustrated in FIG. 20, an optical semiconductor device 500 according to the fifth embodiment includes rib-type single mode waveguides 516, 517, 526, 527, 536, 537 and 546 instead of the single mode waveguides 216, 217, 226, 227, 236, 237 and 246 in the second embodiment.

The single mode waveguide 516 includes, for example, a core portion 216A and slab portions 516A and 518 extending from the core portion 216A in directions parallel to an upper surface 102A. The single mode waveguide 517 includes, for example, a core portion 217A and slab portions 517A and 518 extending from the core portion 217A in directions parallel to the upper surface 102A. The single mode waveguide 526 includes, for example, a core portion 226A and slab portions 526A and 528 extending from the core portion 226A in directions parallel to the upper surface 102A. The single mode waveguide 527 includes, for example, a core portion 227A and slab portions 527A and 528 extending from the core portion 227A in directions parallel to the upper surface 102A. The single mode waveguide 536 includes, for example, a core portion 236A and slab portions 536A and 538 extending from the core portion 236A in directions parallel to the upper surface 102A. The single mode waveguide 537 includes, for example, a core portion 237A and slab portions 537A and 538 extending from the core portion 237A in directions parallel to the upper surface 102A. The single mode waveguide 546 includes, for example, a core portion 246A and slab portions 546A and 546B extending from the core portion 246A in directions parallel to the upper surface 102A. The slab portion 518 may be shared by the single mode waveguides 516 and 517. The slab portion 528 may be shared by the single mode waveguides 526 and 527. The slab portion 538 may be shared by the single mode waveguides 536 and 537. The slab portion 548 may be shared by the single mode waveguides 546 and 547. The single mode waveguide 516 is an example of a fifth single mode waveguide. The single mode waveguide 517 is an example of a sixth single mode waveguide. The single mode waveguide 526 is an example of a seventh single mode waveguide. The single mode waveguide 527 is an example of an eighth single mode waveguide. The single mode waveguide 536 is an example of a ninth single mode waveguide. The single mode waveguide 537 is an example of a tenth single mode waveguide. The single mode waveguide 546 is an example of an eleventh single mode waveguide.

A rib-channel conversion unit 519 is directly connected to the rib-type single mode waveguides 516 and 517, and channel-type single mode waveguides 116 and 117 are directly connected to the rib-channel conversion unit 519. A rib-channel conversion unit 529 is directly connected to the rib-type single mode waveguides 526 and 527, and channel-type single mode waveguides 126 and 127 are directly connected to the rib-channel conversion unit 529. A rib-channel conversion unit 539 is directly connected to the rib-type single mode waveguides 536 and 537, and channel-type single mode waveguides 136 and 137 are directly connected to the rib-channel conversion unit 539. A rib-channel conversion unit 549 is directly connected to the rib-type single mode waveguide 546, and a channel-type single mode waveguide 146 is directly connected to the rib-channel conversion unit 549.

Other configurations are similar to those of the second embodiment.

The fifth embodiment may also provide similar effects to those of the second embodiment. Furthermore, in the fifth embodiment, in any of a 2×2 MMI coupler 110, a 2×2 MMI coupler 120, a 2×2 MMI coupler 130, and a 1×2 MMI coupler 140, the rib-type single mode waveguides are connected to input ports and output ports. Therefore, further improvement in characteristics and tolerance may be expected.

Sixth Embodiment

Figure 21:
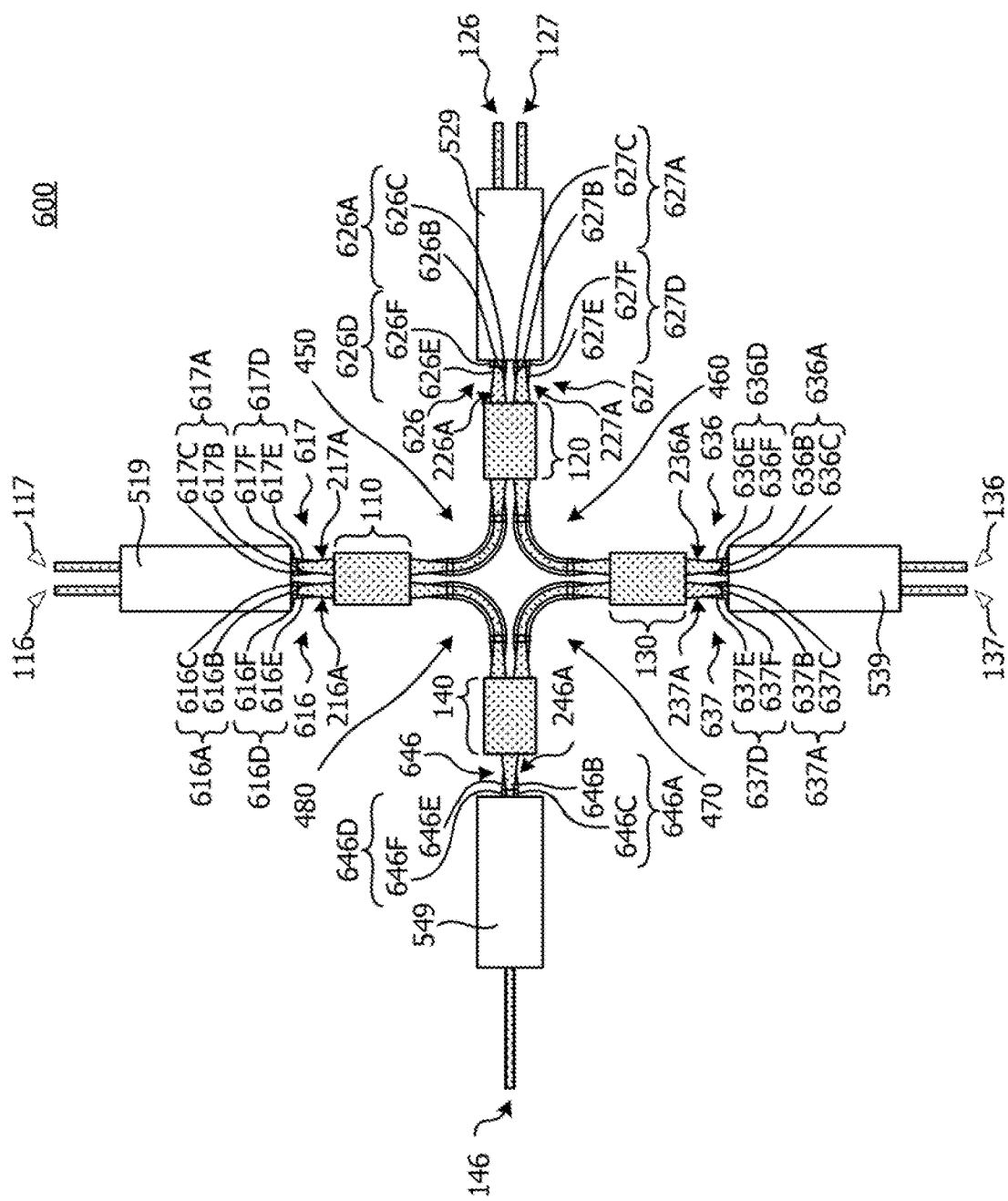
FIG. 21 is a perspective plan view illustrating an optical semiconductor device according to a sixth embodiment.

Next, a sixth embodiment will be described. The sixth embodiment differs from the fourth embodiment mainly in a configuration of a slab portion of a channel-type single mode waveguide. FIG. 21 is a perspective plan view illustrating an optical semiconductor device according to the sixth embodiment.

As illustrated in FIG. 21, an optical semiconductor device 600 according to the sixth embodiment includes rib-type single mode waveguides 616, 617, 626, 627, 636, 637 and 646 instead of the single mode waveguides 216, 217, 226, 227, 236, 237 and 246 in the fourth embodiment.

The single mode waveguide 616 includes, for example, a core portion 216A and slab portions 616A and 616D extending from the core portion 216A in directions parallel to an upper surface 102A. The slab portion 616A is on a side of the core portion 216A closer to a core portion 217A, and the slab portion 616D is on the opposite side of the core portion 216A from the slab portion 616A. The slab portion 616A includes a taper portion 616B on a side of a core taper portion 216B and a linear portion 616C on a side of a linear portion 216C. The slab portion 616D includes a taper portion 616E on a side of the core taper portion 216B and a linear portion 616F on a side of the linear portion 216C. The taper portion 616B, the linear portion 616C, the taper portion 616E, and the linear portion 616F are respectively disposed symmetrically with the taper portion 483B, the linear portion 483D, the taper portion 484B, and the linear portion 484D (see FIG. 18D) about a 2×2 MMI coupler 110. The single mode waveguide 616 is an example of the fifth single mode waveguide.

The single mode waveguide 617 includes, for example, a core portion 217A and slab portions 617A and 617D extending from the core portion 217A in directions parallel to the upper surface 102A. The slab portion 617A is on a side of the core portion 217A closer to the core portion 216A, and the slab portion 617D is on the opposite side of the core portion 217A from the slab portion 617A. The slab portion 617A includes a taper portion 617B on a side of a core taper portion 217B and a linear portion 617C on a side of a linear portion 217C. The slab portion 617D includes a taper portion 617E on a side of the core taper portion 2178 and a linear portion 617F on a side of the linear portion 217C. The taper portion 617B, the linear portion 617C, the taper portion 617E, and the linear portion 617F are respectively disposed symmetrically with the taper portion 453A, the linear portion 453C, the taper portion 454A, and the linear portion 454C (see FIG. 18A) about the 2×2 MMI coupler 110. The single mode waveguide 617 is an example of the sixth single mode waveguide.

The single mode waveguide 626 includes, for example, a core portion 226A and slab portions 626A and 626D extending from the core portion 226A in directions parallel to the upper surface 102A. The slab portion 626A is on a side of the core portion 226A closer to a core portion 227A, and the slab portion 626D is on the opposite side of the core portion 226A from the slab portion 626A. The slab portion 626A includes a taper portion 626B on a side of a core taper portion 226B and a linear portion 626C on a side of a linear portion 226C. The slab portion 626D includes a taper portion 626E on a side of the core taper portion 226B and a linear portion 626F on a side of the linear portion 226C. The taper portion 626B, the linear portion 626C, the taper portion 626E, and the linear portion 626F are respectively disposed symmetrically with the taper portion 453B, the linear portion 453D, the taper portion 454B, and the linear portion 454D (see FIG. 18A) about a 2×2 MMI coupler 120. The single mode waveguide 626 is an example of the seventh single mode waveguide.

The single mode waveguide 627 includes, for example, the core portion 227A and slab portions 627A and 627D extending from the core portion 227A in directions parallel to the upper surface 102A. The slab portion 627A is on a side of the core portion 227A closer to the core portion 226A, and the slab portion 627D is on the opposite side of the core portion 227A from the slab portion 627A. The slab portion 627A includes a taper portion 627 on a side of a core taper portion 227B and a linear portion 627C on a side of a linear portion 227C. The slab portion 627D includes a taper portion 627E on a side of the core taper portion 227B and a linear portion 627F on a side of the linear portion 227C. The taper portion 627B, the linear portion 627C, the taper portion 627E, and the linear portion 627F are respectively disposed symmetrically with the taper portion 463A, the linear portion 463C, the taper portion 464A, and the linear portion 464C (see FIG. 18B) about the 2×2 MMI coupler 120. The single mode waveguide 627 is an example of the eighth single mode waveguide.

The single mode waveguide 636 includes, for example, a core portion 236A and slab portions 636A and 636D extending from the core portion 236A in directions parallel to the upper surface 102A. The slab portion 636A is on a side of the core portion 236A closer to a core portion 237A, and the slab portion 636D is on the opposite side of the core portion 236A from the slab portion 636A. The slab portion 636A includes a taper portion 636B on a side of a core taper portion 236B and a linear portion 636C on a side of a linear portion 236C. The slab portion 636D includes a taper portion 636E on a side of the core taper portion 2368 and a linear portion 636F on a side of the linear portion 236C. The taper portion 636B, the linear portion 636C, the taper portion 636E, and the linear portion 636F are respectively disposed symmetrically with the taper portion 463B, the linear portion 463D, the taper portion 464B, and the linear portion 464D (see FIG. 18B) about a 2×2 MMI coupler 130. The single mode waveguide 636 is an example of the ninth single mode waveguide.

The single mode waveguide 637 includes, for example, the core portion 237A and slab portions 637A and 637D extending from the core portion 237A in directions parallel to the upper surface 102A. The slab portion 637A is on a side of the core portion 237A closer to the core portion 236A, and the slab portion 637D is on the opposite side of the core portion 237A from the slab portion 637A. The slab portion 637A includes a taper portion 637B on a side of a core taper portion 237B and a linear portion 637C on a side of a linear portion 237C. The slab portion 637D includes a taper portion 637E on a side of the core taper portion 237B and a linear portion 637F on a side of the linear portion 237C. The taper portion 637B, the linear portion 637C, the taper portion 637E, and the linear portion 637F are respectively disposed symmetrically with the taper portion 473A, the linear portion 473C, the taper portion 474A, and the linear portion 474C (see FIG. 18C) about the 2×2 MMI coupler 130. The single mode waveguide 637 is an example of the tenth single mode waveguide.

The single mode waveguide 646 includes, for example, a core portion 246A and slab portions 646A and 646D extending from the core portion 246A in directions parallel to the upper surface 102A. The slab portion 646A is on a side of the core portion 246A closer to the 2×2 MMI coupler 130, and the slab portion 646D is on a side of the core portion 246A closer to the 2×2 MMI coupler 110. The slab portion 646A includes a taper portion 646 on a side of a core taper portion 246B and a linear portion 646C on a side of a linear portion 246C. The slab portion 646D includes a taper portion 646E on a side of the core taper portion 2468 and a linear portion 646F on a side of the linear portion 246C. The taper portion 646B, the linear portion 646C, the taper portion 646E, and the linear portion 646F respectively have the symmetrical shape with the taper portion 474B, the linear portion 474D, the taper portion 473D, and the linear portion 473D (see FIG. 18D) about a 2×2 MMI coupler 140. The single mode waveguide 646 is an example of the eleventh single mode waveguide.

A rib-channel conversion unit 519 is directly connected to the rib-type single mode waveguides 616 and 617, and channel-type single mode waveguides 116 and 117 are directly connected to the rib-channel conversion unit 519.

A rib-channel conversion unit 529 is directly connected to the rib-type single mode waveguides 626 and 627, and channel-type single mode waveguides 126 and 127 are directly connected to the rib-channel conversion unit 529.

A rib-channel conversion unit 539 is directly connected to the rib-type single mode waveguides 636 and 637, and channel-type single mode waveguides 136 and 137 are directly connected to the rib-channel conversion unit 539.

A rib-channel conversion unit 549 is directly connected to the rib-type single mode waveguide 646, and a channel-type single mode waveguides 146 is directly connected to the rib-channel conversion unit 549.

Other configurations are similar to those of the fourth embodiment.

The sixth embodiment may also provide similar effects to those of the fourth embodiment. Furthermore, in the sixth embodiment, in any of the 2×2 MMI coupler 110, the 2×2 MMI coupler 120, the 2×2 MMI coupler 130, and the 1×2 MMI coupler 140, the rib-type single mode waveguides are connected to input ports and output ports. Therefore, further improvement in characteristics and tolerance may be expected.

Note that, in the third embodiment, rib-type single mode waveguides may be connected to the input ports and the output ports of each MMI coupler as in the fifth and sixth embodiments.

In any of the embodiments, a Y-branch may be used instead of the 1×2 MMI coupler 140.

Seventh Embodiment

Figure 22:
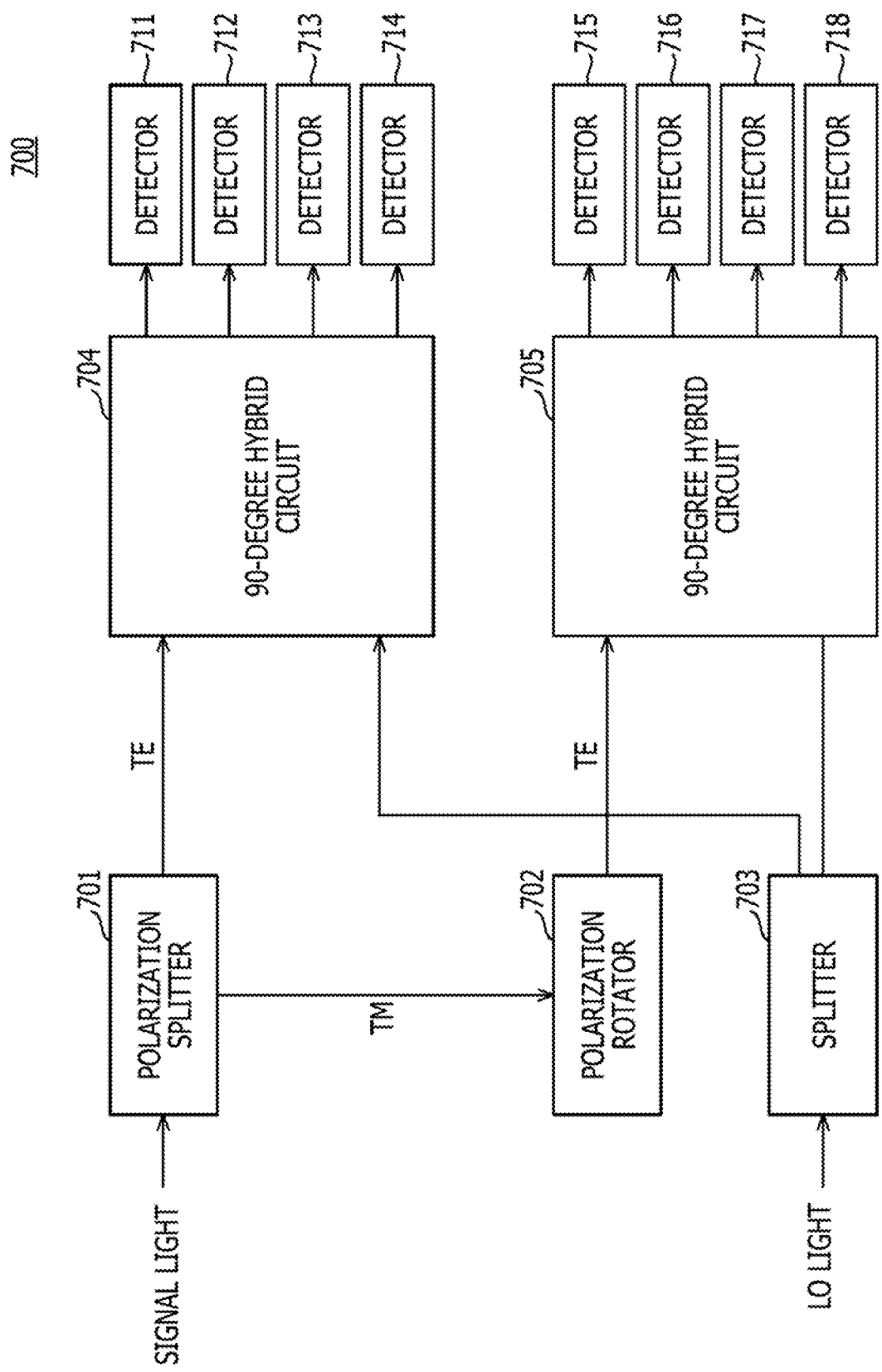
FIG. 22 is a block diagram illustrating a receiver according to a seventh embodiment.

Next, a seventh embodiment will be described. The seventh embodiment relates to a receiver including the optical semiconductor device according to any one of the first to sixth embodiments. FIG. 22 is a block diagram illustrating the receiver according to the seventh embodiment.

As illustrated in FIG. 22, a receiver 700 according to the seventh embodiment includes a polarization splitter 701, a polarization rotator 702, a splitter 703, 90-degree hybrid circuits 704 and 705, and detectors 711 to 718. The optical semiconductor devices according to any of the first to sixth embodiments are used for the 90-degree hybrid circuits 704 and 705. The detectors 711 to 718 are photodiodes, for example.

The polarization splitter 701 splits input signal light into a TE wave and a TM wave. The polarization rotator 702 converts the TM wave output from the polarization splitter 701 into a TE wave. The splitter 703 splits input LO light. The TE wave output from the polarization splitter 701 and the LO light split by the splitter 703 are input to the 90-degree hybrid circuit 704. The TE wave output from the polarization rotator 702 and the LO light split by the splitter 703 are input to the 90-degree hybrid circuit 705. The 90-degree hybrid circuit 704 outputs Q component signal light having a phase difference of 180 degrees and I component signal light having a phase difference of 180 degrees. The detectors 711 and 712 receive the Q component signal light output from the 90-degree hybrid circuit 704 and convert the signal light into electric signals. The detectors 713 and 714 receive the I component signal light output from the 90-degree hybrid circuit 704 and convert the signal light into electric signals. The 90-degree hybrid circuit 705 outputs Q component signal light having a phase difference of 180 degrees and I component signal light having a phase difference of 180 degrees. The detectors 715 and 716 receive the Q component signal light output from the 90-degree hybrid circuit 705 and convert the signal light into electric signals. The detectors 717 and 718 receive the I component signal light output from the 90-degree hybrid circuit 705 and convert the signal light into electric signals.

Such a receiver 700 may be used as a coherent receiver.

Although the preferred embodiments and the like have been described in detail above, various modifications and substitutions may be made to the above-described embodiments and the like, without being limited to the above-described embodiments and the like, and without departing from the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An optical semiconductor device comprising:
a first optical coupler including a first input port, a second input port, a first output port, and a second output port;
a first optical branching device including a third input port, a fourth input port, a third output port, and a fourth output port;
a second optical coupler including a fifth input port, a sixth input port, a fifth output port, and a sixth output port;
a second optical branching device including a seventh input port, a seventh output port, and an eighth output port;
a first single mode waveguide configured to connect the second input port and the third output port;
a second single mode waveguide configured to connect the fourth output port and the fifth input port;
a third single mode waveguide configured to connect the sixth input port and the seventh output port; and
a fourth single mode waveguide configured to connect the eighth output port and the first input port,
the first single mode waveguide includes a first core,
the second single mode waveguide includes a second core
the third single mode waveguide includes a third core,
the fourth single mode waveguide includes a fourth core, and
the first core includes:
a first core taper configured to be directly connected to the second input port and becomes narrower in width as a distance from the second input port increases, and a second core taper configured to be directly connected to the third output port and becomes narrower in width as a distance from the third output port increases.

2. The optical semiconductor device according to claim 1, wherein
the first optical coupler includes a channel-type first multimode waveguide,
the first optical branching device includes a channel-type second multimode waveguide,
the second optical coupler includes a channel-type third multimode waveguide, and
the second optical branching device includes a channel-type fourth multimode waveguide.

3. The optical semiconductor device according to claim 1, wherein the first single mode waveguide, the second single mode waveguide, the third single mode waveguide, and the fourth single mode waveguide are provided over a common plane.

4. The optical semiconductor device according to claim 3, wherein
the first single mode waveguide includes:
a first slab configured to extend from the first core in a direction parallel to the plane,
the second single mode waveguide includes:
a second slab configured to extend from the second core in a direction parallel to the plane,
the third single mode waveguide includes:
a third slab configured to extend from the third core portion in a direction parallel to the plane,
the fourth single mode waveguide includes:
a fourth slab configured to extend from the fourth core in a direction parallel to the plane,
the second core includes:
a third core taper configured to be directly connected to the fourth output port and becomes narrower in width as a distance from the fourth output port increases, and
a fourth core taper configured to be directly connected to the fifth input port and becomes narrower in width as a distance from the fifth input port increases,
the third core includes:
a fifth core taper configured to be directly connected to the sixth input port and becomes narrower in width as a distance from the sixth input port increases, and
a sixth core taper configured to be directly connected to the seventh output port and becomes narrower in width as a distance from the seventh output port increases, and
the fourth core includes:
a seventh core taper configured to be directly connected to the eighth output port and becomes narrower in width as a distance from the eighth output port increases, and
an eighth core taper configured to be directly connected to the first input port and becomes narrower in width as a distance from the first input port increases.

5. The optical semiconductor device according to claim 4, wherein, in the directions parallel to the plane, the first slab, the second slab, the third slab, and the fourth slab are separated from each other.

6. The optical semiconductor device according to claim 5, wherein
the first slab includes:
a first slab taper configured to be located at a side of the first core taper and becomes wider in width as a distance from the second input port increases, and
a second slab taper configured to be located at a side of the second core taper and becomes wider in width as a distance from the third output port increases,
the second slab includes:
a third slab taper configured to be located at a side of the third core taper and becomes wider in width as a distance from the fourth output port increases, and
a fourth slab taper configured to be located at a side of the fourth core taper and becomes wider in width as a distance from the fifth input port increases,
the third slab portion includes:
a fifth slab taper configured to be located at a side of the fifth core taper and becomes wider in width as a distance from the sixth input port increases, and
a sixth slab taper configured to be located at a side of the sixth core taper and becomes wider in width as a distance from the seventh output port increases, and
the fourth slab portion includes:
a seventh slab taper configured to be located at a side of the seventh core taper and becomes wider in width as a distance from the eighth output port increases, and
an eighth slab taper configured to be located at a side of the eighth core taper and becomes wider in width as a distance from the first input port increases.

7. The optical semiconductor device according to claim 1, further comprising:
a fifth single mode waveguide configured to connect to the first output port;
a sixth single mode waveguide configured to connect to the second output port;
a seventh single mode waveguide configured to connect to the third input port;
an eighth single mode waveguide configured to connect to the fourth input port;
a ninth single mode waveguide configured to connect to the fifth output port;
a tenth single mode waveguide configured to connect to the sixth output port; and
an eleventh single mode waveguide configured to connect to the seventh input port.

8. The optical semiconductor device according to claim 1, wherein the first single mode waveguide, the second single mode waveguide, the third single mode waveguide, and the fourth single mode waveguide are rib-type waveguide.

9. A reception apparatus comprising:
a first optical coupler including a first input port, a second input port, a first output port, and a second output port;
a first optical branching device including a third input port, a fourth input port, a third output port, and a fourth output port;
a second optical coupler including a fifth input port, a sixth input port, a fifth output port, and a sixth output port;
a second optical branching device including a seventh input port, a seventh output port, and an eighth output port;
a first single mode waveguide configured to connect the second input port and the third output port;
a second single mode waveguide configured to connect the fourth output port and the fifth input port;
a third single mode waveguide configured to connect the sixth input port and the seventh output port; and
a fourth single mode waveguide configured to connect the eighth output port and the first input port,
the first single mode waveguide includes a first core,
the second single mode waveguide includes a second core the third single mode waveguide includes a third core,
the fourth single mode waveguide includes a fourth core, and
the first core includes:
  a first core taper configured to be directly connected to the second input port and becomes narrower in width as a distance from the second input port increases, and
  a second core taper configured to be directly connected to the third output port and becomes narrower in width as a distance from the third output port increases.

* * * * *